United States Patent
Okamoto et al.

(10) Patent No.: US 9,636,852 B2
(45) Date of Patent: May 2, 2017

(54) INJECTION MOLDING METHOD

(75) Inventors: Akio Okamoto, Yamaguchi (JP);
Kazuaki Miyamoto, Yamaguchi (JP);
Toshikazu Iwamoto, Yamaguchi (JP);
Yuichiro Fukuda, Yamaguchi (JP)

(73) Assignee: UBE MACHINERY CORPORATION, LTD., Yamaguchi (JP)

( * ) Notice: Subject to any disclaimer, the term of this patent is extended or adjusted under 35 U.S.C. 154(b) by 529 days.

(21) Appl. No.: 14/118,218

(22) PCT Filed: Apr. 27, 2012

(86) PCT No.: PCT/JP2012/061442
§ 371 (c)(1),
(2), (4) Date: Dec. 3, 2013

(87) PCT Pub. No.: WO2012/160952
PCT Pub. Date: Nov. 29, 2012

(65) Prior Publication Data
US 2014/0077406 A1 Mar. 20, 2014

(30) Foreign Application Priority Data
May 20, 2011 (JP) .................... 2011-112938
May 20, 2011 (JP) .................... 2011-112939

(51) Int. Cl.
*B29C 44/02* (2006.01)
*B29C 44/08* (2006.01)
(Continued)

(52) U.S. Cl.
CPC ........... *B29C 44/086* (2013.01); *B29C 44/04* (2013.01); *B29C 44/0461* (2013.01);
(Continued)

(58) Field of Classification Search
CPC ................................................. B29C 44/086
See application file for complete search history.

(56) References Cited

U.S. PATENT DOCUMENTS 3,966,372 A * 6/1976 Yasuike ............. B29C 45/1645
264/45.1
4,124,308 A * 11/1978 Sokolow ............. B29C 44/0492
264/328.12

(Continued)

FOREIGN PATENT DOCUMENTS

JP 50-090658 A 7/1975
JP 54-034378 A 3/1979
(Continued)

OTHER PUBLICATIONS

International Search Report for PCT/JP2012/061442 dated Jul. 17, 2012.

*Primary Examiner* — Ryan Ochylski
(74) *Attorney, Agent, or Firm* — Nixon Peabody LLP; Joseph Bach, Esq.

(57) ABSTRACT

An injection molding method comprising: a mold clamping step of clamping a first mold and a second mold to form a mold cavity; a first injection filling step of injecting a foamable molten resin into the mold cavity to fill an interior of the mold cavity with the foamable molten resin, after completion of the mold clamping step; a mold cavity expansion step of expanding the mold cavity by a specified quantity to cause the foamable molten resin to foam, after the start of the first injection filling step; and a second injection filling step of pouring a molten resin or gas into the foamable molten resin within the mold cavity, after the completion of the first injection filling step, and after the start of the mold cavity expansion step.

3 Claims, 13 Drawing Sheets

(51) Int. Cl.
  *B29C 45/16*  (2006.01)
  *B29C 45/17*  (2006.01)
  *B29C 44/04*  (2006.01)
  *B29C 44/58*  (2006.01)
  *B29K 105/26* (2006.01)
  *B29L 9/00*   (2006.01)

(52) U.S. Cl.
  CPC ........ *B29C 44/586* (2013.01); *B29C 45/1635* (2013.01); *B29C 45/1705* (2013.01); *B29K 2105/26* (2013.01); *B29L 2009/00* (2013.01)

(56) References Cited

U.S. PATENT DOCUMENTS

| | | |
|---|---|---|
| 4,415,680 A | 11/1983 | Ushirokawa et al. |
| 6,146,562 A * | 11/2000 | Hettinga ............... B29C 44/086 264/328.7 |
| 2006/0066088 A1 * | 3/2006 | Hier .................... B29C 44/086 280/743.1 |
| 2006/0099395 A1 | 5/2006 | Cowelchuk et al. |
| 2009/0121375 A1 * | 5/2009 | Okamoto ............ B29C 44/086 264/46.4 |
| 2012/0196115 A1 | 8/2012 | Choe et al. |
| 2016/0318219 A1 | 11/2016 | Okamoto et al. |

FOREIGN PATENT DOCUMENTS

| | | |
|---|---|---|
| JP | 06-166073 A | 6/1994 |
| JP | 08-174603 A | 7/1996 |
| JP | 10-211630 A | 8/1998 |
| JP | 10-272644 A | 10/1998 |
| JP | 2001-054919 A | 2/2001 |
| JP | 2001-096566 A | 4/2001 |
| JP | 2001-162650 A | 6/2001 |
| JP | 2008-260245 A | 10/2008 |
| JP | 2009-214498 A | 9/2009 |

* cited by examiner

INJECTION MOLDING METHOD

RELATED APPLICATIONS

This application is a National Phase of International Application No. PCT/JP2012/061442, entitled "INJECTION MOLDING METHOD", which was filed on Apr. 27, 2012, and which claims priority of Japanese Application No. 2011-112938, filed on May 20, 2011, and Japanese Application No. 2011-112939, filed on May 20, 2011, and the disclosures of which are hereby incorporated by reference herein in their entirety.

TECHNICAL FIELD

The present invention relates to, for example, an injection molding method of a sandwich molded product including a surface layer and an inner layer, a hollow molded product having a hollow portion therein, or the like.

BACKGROUND ART

Hitherto, a sandwich molded product including a surface layer, and an inner layer included in the surface layer has been known. As an injection molding method for molding the sandwich molded product (co-injection method), mainly two methods of a multi-stage molding method and a simultaneous molding method have been known. The multi-stage molding method is a method that injects and fills a surface layer molten resin into a mold cavity, and then injects and fills an inner layer molten resin into the surface layer molten resin to fill the interior of the mold cavity with the two molten resins (see Patent Literature 1). The simultaneous molding method is a method that injects and fills the surface layer molten resin into the mold cavity, and then injects and fills the surface layer molten resin and the inner layer molten resin into the surface layer molten resin injected earlier in a laminar flow state in which the surface layer molten resin is disposed on an outer circumferential side and the inner layer molten resin is disposed in the center thereof, thereby filling the interior of the mold cavity with the two molten resins (see Patent Literature 2).

Further, hitherto, a hollow molded product having a hollow portion therein has been known. As an injection molding method for molding the hollow molded product, for example, a hollow injection molding method (gas assist injection molding method) has been known. The hollow injection molding method is a method that injects and fills the molten resin into the mold cavity, then pours the pressurized gas into the molten resin to form a hollow portion, and discharges the poured pressurized gas (see Patent Literature 3). In the hollow injection molding method, generally, molding is performed at a constant volume of the mold cavity, but a method for expanding the volume of the mold cavity in conjunction with pouring of the pressurized gas has also been known (see Patent Literature 4). The method for expanding the volume of the mold cavity in conjunction with pouring of the pressurized gas is referred to as a high hollow molding method separately from the general hollow injection molding method, and is a method which is capable of increasing the volume of the hollow portion of the interior of the hollow molded product.

CITATION LIST

Patent Literatures

Patent Literature 1: JP 08-174603 A
Patent Literature 2: JP 2001-096566 A
Patent Literature 3: JP 10-272644 A
Patent Literature 4: JP 2001-054919 A

SUMMARY OF INVENTION

Technical Problem

However, in the injection molding method described in Patent Literatures 1 to 4, there has been a problem in that the molten resin or the pressurized gas to be poured later may be ejected from the molten resin first injected and filled into the mold cavity.

That is, the injection molding method described in Patent Literatures 1 to 3 sets an amount of injection filling of the molten resin to be first injected and filled into the mold cavity to an amount less than the volume of the mold cavity, and injects and fills the first molten resin so as to enter a so-called short shot state. In general, since the thermal conductivity of gas in the mold cavity is lower than that of an inner surface (such as metal) of the mold cavity, in the molten resin first injected and filled into the mold cavity, the cooling solidification of a location thereof coming into contact with the gas in the mold cavity is slower than that of a location coming into contact with the inner surface of the mold cavity, and intensity is weak. For this reason, when the molten resin or the pressurized gas is injected and filled into the molten resin first injected and filled into the mold cavity, the molten resin or the pressurized gas may be ejected from the location having the weak intensity, and there is a risk of an occurrence of resin reversal failure or gas rupture failure.

Further, according to the injection molding method of Patent Literature 4, after the molten resin is injected and filled into the mold cavity, the mold cavity is expanded, and then by pouring the pressurized gas into the molten resin, the molten resin is allowed to flow in the expanded mold cavity so as to be enlarged to a desired size of a molded product. For this reason, in the injection molding method of Patent Literature 4, the flow of the molten resin is disturbed, for example, in a complex product shape, a reinforcing rib structure of a back surface, a displacement portion of the thickness of the product, or the like, and there is a risk of an occurrence of the gas rupture failure.

An object of the invention is to provide an injection molding method capable of suppressing the occurrence of resin reversal failure and gas rupture failure.

Solution to Problem

To solve the above object, an injection molding method according to the present invention is an injection molding method for molding a molded product using a first mold and a second mold which are capable of forming a mold cavity, the method including: a mold clamping step of clamping the first mold and the second mold to form the mold cavity, a first injection filling step of injecting a foamable molten resin into the mold cavity to fill the interior of the mold cavity with the foamable molten resin, after completion of the mold clamping step, a mold cavity expansion step of expanding the mold cavity by a specified quantity to cause the foamable molten resin to foam, after the start of the first injection filling step, and a second injection filling step of pouring a molten resin or gas into the foamable molten resin within the mold cavity, after the completion of the first injection filling step, and after the start of the mold cavity expansion step.

An injection molding method according to the present invention, may further include: a pressurization step of pouring the pressurized gas into the mold cavity to pressurize the interior of the mold cavity at a pressure higher than or equal to a foaming expansion pressure of the foamable molten resin, after the start of the mold clamping step, and before the start of the first injection filling step, and a pressurized gas discharge step of discharging the pressurized gas, after the start of the first injection filling step. In this case, it is preferable that the second injection filling step is a step of pouring the pressurized gas into the foamable molten resin within the mold cavity via a pressurized gas flow path, and the pressurization step is a step of pouring the pressurized gas into the mold cavity via the pressurized gas flow path used in the second injection filling step.

In the injection molding method according to the present invention, the mold cavity expansion step may be a step of expanding the mold cavity so that a volume of the mold cavity becomes a volume greater than the volume of the molded product, and the injection molding method may further include a mold cavity reduction step of reducing the mold cavity by a specified quantity so that the volume of the mold cavity becomes the volume of the molded product, after the completion of the mold cavity expansion step, and after the start of the second injection filling step.

In the injection molding method according to the present invention, the mold cavity expansion step may be a step of expanding the mold cavity so that a volume of the mold cavity becomes less than the volume of the molded product, the second injection filling step may be a step of pouring an inner layer foamable molten resin into the foamable molten resin within the mold cavity, and the injection molding method may further include a mold cavity re-expansion step of expanding the mold cavity by a specified quantity so that the volume of the mold cavity becomes the volume of the molded product to cause the inner layer foamable molten resin to foam, after the start of the second injection filling step. In this case, it is preferable that the mold cavity re-expansion step is a step of expanding the mold cavity so that the volume of the mold cavity becomes a volume greater than the volume of the molded product, and the injection molding method further includes a mold cavity reduction step of reducing the mold cavity by a specified quantity so that the volume of the mold cavity becomes the volume of the molded product, after the completion of the mold cavity re-expansion step.

In the injection molding method according to the present invention, at least one of expansion and reduction of the mold cavity may be performed by at least one of a mold opening and closing operation of a mold opening and closing mechanism of an injection molding apparatus, and a movement operation of a movable part in the mold.

Another injection molding method according to the present invention, an injection molding method for molding a sandwich molded product including a surface layer and the inner layer using a first mold and a second mold which are capable of forming a mold cavity, the method including: a mold clamping step of clamping the first mold and the second mold to form the mold cavity, a first injection filling step of injecting a non-foamable molten resin to the mold cavity to fill an interior of the mold cavity with the non-foamable molten resin, after completion of the mold clamping step, a mold cavity expansion step of slightly opening at least one of the first mold and the second mold with respect to the other thereof by a specified quantity to expand the mold cavity, after the completion of the first injection filling step, and a second injection filling step of injecting and filling a molten resin into the non-foamable molten resin within the mold cavity, after the start of the mold cavity expansion step.

In the injection molding method according to the present invention, the mold cavity expansion step may be a step of expanding the mold cavity so that a volume of the mold cavity becomes a volume greater than the volume of the molded product, and the injection molding method may further include a mold cavity reduction step of reducing the mold cavity by a specified quantity so that the volume of the mold cavity becomes the volume of the molded product, after the completion of the mold cavity expansion step, and after the start of the second injection filling step.

In the injection molding method according to the present invention, at least one of expansion and reduction of the mold cavity may be performed by at least one of a mold opening and closing operation of a mold opening and closing mechanism of an injection molding apparatus, and a movement operation of a movable part in the mold.

Advantageous Effects of Invention

According to the invention, it is possible to provide an injection molding method that is capable of suppressing the occurrence of the resin reversal failure and the gas rupture failure.

DESCRIPTION OF EMBODIMENTS

Figure 1A:
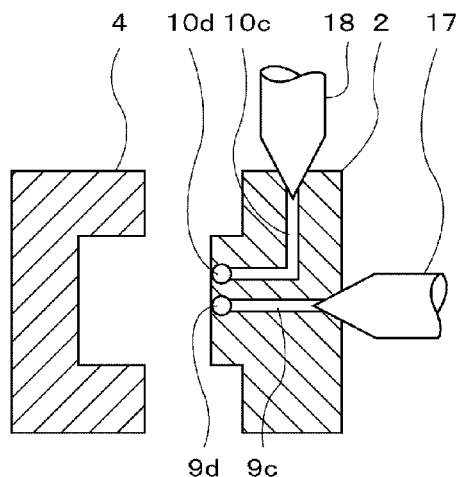
FIG. 1A is a schematic cross-sectional view illustrating a mold opening state before a molding cycle of an injection molding method according to a first embodiment of the invention.

Hereinbelow, embodiments for carrying out the invention will be described in detail with reference to the accompanying drawings. An injection molding method according to first to fifth embodiments relates to an injection molding method for molding a sandwich molded product including a surface layer and an inner layer, the surface layer including the inner layer. An injection molding method according to sixth and seventh embodiments relates to an injection molding method for molding a hollow molded product having a hollow portion therein.

The sandwich molded product is one of multi-layer molded products formed by various combinations of the different materials, the same materials, the different colors, and the same colors in a resin molded product. Unlike a multi-layer molded product in which another layer is laminated only on one surface of one layer, since such a sandwich molded product is a multi-layer molded product in which the inner layer is included in the surface layer, the included inner layer is not substantially completely exposed to the surface layer, and it is possible to secure exterior characteristics and design characteristics of the resin molded product itself on the surface layer. Accordingly, in recent years, a sandwich molded product, in which a recycled resin or the like using plastic recyclable waste, waste plastic, or the like as a raw material and suitable for cost reduction and environmental response is adopted to the inner layer, has been adopted as a resin molded product of large parts such as an automobile bumper, a transportation and logistics pallet, and a container box with a large used amount of resin. In addition, the sandwich molded product has also been adopted as a resin molded product (opening and closing cover or the like of home appliances and automobile inner layer parts) in which a foamable resin aimed at applying weight reduction, damping, thermal insulation, sound insulation, and flexibility, or functional resins such as high strength resin, blocking and absorbing resin of electromagnetic wave and ionizing radiation, water-absorbing resin, and impermeable resin are used as an inner layer thereof, and which has excellent product exterior characteristics by the surface layer while applying functionality depending on the application, and has both front and rear surfaces serving as design surfaces. The hollow molded product is a molded product in which a hollow portion is formed therein, and is formed primarily for the weight reduction of the resin molded product.

First Embodiment

The injection molding method according to the first embodiment of the invention will be described with reference to FIGS. 1A to 1F and 2A to 2C. FIGS. 1A to 1F are schematic cross-sectional views of a mold illustrating each step of the injection molding method of a sandwich molded product according to the first embodiment. FIGS. 2A to 2C are schematic cross-sectional views illustrating a process in which the sandwich molded product is molded.

Figure 2A:
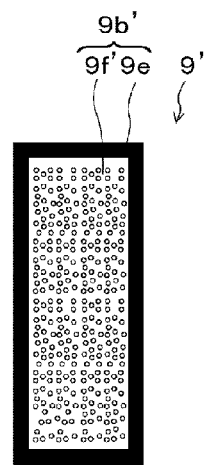
FIG. 2A is a schematic cross-sectional view illustrating a state of a surface layer foamable molten resin in the mold cavity expansion step of the injection molding method according to the first embodiment.
Figure 2B:
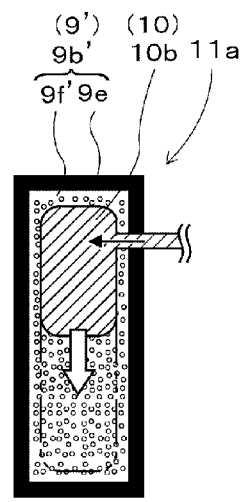
FIG. 2B is a schematic cross-sectional view illustrating a flow state of an inner layer non-foamable molten resin at the time of the start of the second injection filling step of the injection molding method according to the first embodiment.
Figure 2C:
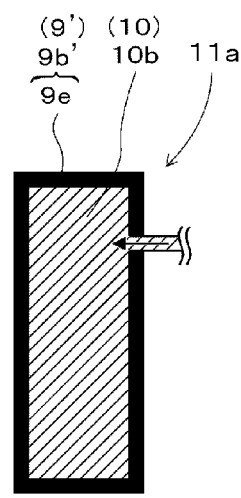
FIG. 2C is a schematic cross-sectional view illustrating a flow state of the inner layer non-foamable molten resin at the time of the completion of the second injection filling step of the injection molding method according to the first embodiment.

As illustrated in FIG. 1A, an injection molding machine used for the injection molding method according to the first embodiment includes a fixed mold 2 (first mold) and a movable mold 4 (second mold) which are capable of forming a mold cavity 9a, a first injection unit 17 capable of injecting and filling a surface layer foamable molten resin 9b' (first material) into the mold cavity 9a, and a second injection unit 18 capable of injecting and filling an inner layer non-foamable molten resin 10b (second material) into the mold cavity 9a.

The fixed mold 2 is attached to a fixed platen (not illustrated) erected on a base (not illustrated). Furthermore, the fixed mold 2 has a surface layer resin flow path 9c through which the surface layer foamable molten resin 9b' injected from the first injection unit 17 flows toward the interior of the mold cavity 9a, a gate valve (resin cutoff opening changeover valve) 9d provided at a gate portion communicating with the mold cavity 9a in the surface layer resin flow path 9c, an inner layer resin flow path 10c through which the inner layer non-foamable molten resin 10b injected from the second injection unit 18 flows toward the interior of the mold cavity 9a, and a gate valve 10d provided at a gate portion communicating with the mold cavity 9a of the inner layer resin flow path 10c. The movable mold 4 is attached to a movable platen (not illustrated) so as to be opposed to the fixed mold 2, and is disposed so as to movable in a longitudinal direction (hereinafter, referred to as a mold opening and closing direction) of the injection molding machine by a mold opening and closing mechanism (not illustrated).

In the fixed mold 2 and the movable mold 4, division surfaces of each mold (in some cases, also referred to as a mold division surface, a division surface, and a cut surface) have a share edge structure to vary the volume of the mold cavity in the mold opening and closing operation of the mold opening and closing mechanism of the injection molding machine. The share edge structure is also referred to as a clipper structure, a spigot structure or the like, and is a structure that is generally known as a structure of a fitting portion configured to form the division surface of the mold. Furthermore, the share edge structure is a structure that is capable of preventing the molten resin injected and filled into the mold cavity from leaking to the outside of the mold by a specified quantity, even when opening the mold, by forming the fitting portion capable of expanding in the mold opening and closing direction and being inserted and removed while sliding each other, between the fixed mold and the movable mold. The mold of the share edge structure is adopted in an expansion foaming molding method (also referred to as a core-back foaming molding method) for slightly opening the mold during the molding step, an in-mold coating molding method (also referred to as an in-mold coating method, and an in-mold painting method) or the like.

The first injection unit 17 and the second injection unit 18 are disposed on the fixed mold 2 side, for example, by various methods such as a parallel-type arrangement, a V-shaped arrangement, an oblique-type arrangement, and an L-shaped arrangement. The parallel-type arrangement is an aspect in which both the first injection unit 17 and the second injection unit 18 are disposed to be parallel to the longitudinal direction of the injection molding machine on the rear surface side of the fixed mold 2. The V-shaped arrangement is an aspect in which both the first injection unit 17 and the second injection unit 18 are disposed on the rear surface side of the fixed mold 2 at a slight angle with respect to the longitudinal direction of the injection molding machine. The oblique-type arrangement is an aspect in which a main injection unit is arranged so as to be parallel to the longitudinal direction of the injection molding machine on the rear surface side of the fixed mold 2, and a sub-injection unit is arranged obliquely with respect to the main injection unit on the rear surface side of the fixed mold 2. The L-shaped arrangement is an aspect in which the main injection unit is arranged so as to be parallel to the longitudinal direction of the injection molding machine on the rear surface side of the fixed mold 2, and the sub-injection unit is arranged so as to be orthogonal to the longitudinal direction of the injection molding machine on the side surfaces, the upper surface or the lower surface of the fixed mold 2. These arrangements may be selected suitably by the specifications of injection filling such as the type of used molten resin and the amount of injection filling. The injection molding machine used for the injection molding method according to the first embodiment may be a dedicated injection molding machine for sandwich molding in which two or more injection units are arranged from the beginning, and may be a general-purpose injection molding machine added with a commercially retrofit injection unit.

Furthermore, when the first material and the second material are the same resin material, in the injection molding method according to the first embodiment, since the injection filling steps of each of the first material and the second material rarely overlap even partially, even in an injection molding machine in which only one set of an injection unit including a general-purpose injection molding machine is arranged, in many cases, it is possible to carry out the injection molding method according to the first embodiment. In that case, as long as the gate valve is arranged on the gate portion of the mold cavity side end portion of the resin flow path, the resin flow paths of the first material and the second material may be in a form branched and independent in the mold, and may be in a form in which the resin flow paths are common without branching. Additionally, in each form, a multi-point gate form may be adopted in which one or both resin flow paths of the first material and the second material are further branched to perform the injection filling from a plurality of different gate positions.

Figure 1B:
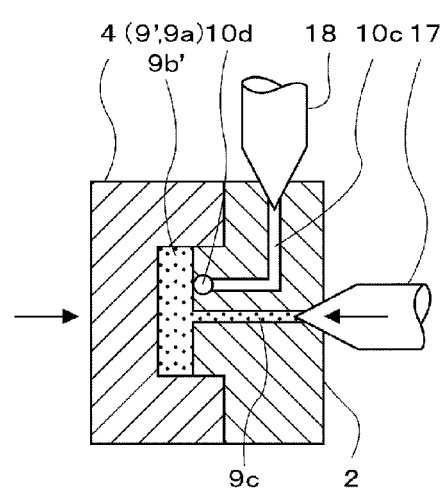
FIG. 1B is a schematic cross-sectional view illustrating a first injection filling step of the injection molding method according to the first embodiment.

As illustrated in FIG. 1B, in the injection molding method according to the first embodiment, the movable mold 4 is moved to the fixed mold 2 side by a mold opening and closing mechanism (not illustrated) from a mold open state before the start of the molding cycle illustrated in FIG. 1A to close the fixed mold 2 and the movable mold 4, and then a mold clamping force is applied (mold clamping step). The mold clamping step is a step of clamping the fixed mold 2 and the movable mold 4 so that the volume of the mold cavity 9a formed by the fixed mold 2 and the movable mold 4 is less than a volume of the product (molded product), and an injection filling ratio of the surface layer foamable molten resin 9b' is approximately 100%.

Next, in the state of applying the mold clamping force, and a gate valve 9d of the surface layer resin flow path 9c is opened, and the surface layer foamable molten resin 9b' including a foaming agent is injected and filled into the mold cavity 9a from the first injection unit 17 via the surface layer resin flow path 9c (first injection filling step). In addition, in the first injection filling step, a gate valve 10d provided at the gate portion of an end portion of the mold cavity 9a side of the inner layer resin flow path 10c is closed, and thus, the surface layer foamable molten resin 9b' injected and filled into the mold cavity 9a does not flow back into the inner layer resin flow path 10c. In the first injection filling step, the interior of the mold cavity 9a is filled with the surface layer foamable molten resin 9b', and at this time, the surface layer foamable molten resin 9b' of the mold cavity 9a is not in a foaming state. For this reason, substantially the entire surface of the surface layer foamable molten resin 9b' is cooled in contact with the inner surface of the mold cavity 9a, a solid skin layer (cooling solidification layer) 9e which covers substantially the entire surface is formed, and high transferability to the skin layer 9e is secured. Furthermore, the exposure of the foam cell to the skin layer 9e when forming the skin layer 9e is suppressed by the mold clamping force that is uniformly applied to substantially the entire surface of the surface layer foamable molten resin 9b'. For that reason, even when the surface layer foamable molten resin 9b' is a foamable molten resin containing the foaming agent, exterior characteristics of the product are improved.

Herein, although the foaming agent contained in the surface layer foamable molten resin 9b' will be described on the assumption that it is a chemical foaming agent, it may be a physical foaming agent. However, in that case, configuration requirements for suitably mixing the physical foaming agent with the surface layer foamable molten resin 9b' are required for the mold or the injection molding machine. Furthermore, in a case where the surface layer foamable molten resin 9b' is a foamable molten resin containing the foaming agent, a so-called gas counter-pressure method may be performed in which, after the start of the mold clamping step (that is, during the mold clamping step, or after the completion of the mold clamping step) and before the start of the first injection filling step, the pressurized gas such as air, nitrogen, and carbon dioxide is poured into the mold cavity 9a from a pressurized gas flow path (not illustrated), the interior of the mold cavity 9a is pressurized at a pressure higher than or equal to the foaming expansion pressure of the surface layer foamable molten resin 9b' containing the foaming agent (pressurization step), and after the start of the first injection filling step (that is, during the first injection filling step or after the completion of the first injection filling step), the pressurized gas poured is discharged from the pressurized gas flow path (pressurized gas discharge step). When performing the expansion foaming molding with the foamable molten resin containing the foaming agent, it is possible to suppress the exposure of the foam cell to the skin layer (cooling solidification layer) by the molding conditions such as the mold clamping force uniformly applied to substantially the entire surface of the surface layer foamable molten resin 9b', the injection conditions, and the mold temperature control. However, there is a case where these molding conditions are complicated, and are contrary to the molding conditions of the sandwich molded product. Even in such a case, as long as such a gas counter pressure method is adopted, it is possible to more reliably suppress the exposure of the foam cell to the skin layer (cooling solidification layer), and even in a sandwich molded product that requires high exterior characteristics and design characteristics, the foamable molten resin containing the foaming agent can be adopted, as the surface layer molten resin of the sandwich molded product in which a non-foamable molten resin generally containing no foaming agent is adopted.

Since the surface layer foamable molten resin 9b' is cooled within the mold immediately after being injected and filled into the mold cavity 9a and the cooling solidification shrinkage proceeds, it is preferable to more inject and fill the surface layer foamable molten resin 9b' at least as much as the cooling solidification shrinkage (volume) compared to the volume of the mold cavity 9a formed by the mold clamping step, in terms of securing the formation of the strong skin layer (cooling solidification layer) 9e of the surface layer foamable molten resin 9b' and the high transferability to the skin layer 9e. Here, although the skin layer 9e is strong against the skin layer formed on a contact portion with the gas within the mold cavity, the skin layer 9e is not a completely cured layer but is a layer such as a thin film showing a rubber-like elastic behavior in a layer direction in which the cooling solidification is still in progress at the temperature higher than or equal to a resin softening point temperature or a glass solidification temperature, and the skin layer 9e is able to follow the variable of the volume of the mold cavity 9a by expansion and reduction.

Figure 1C:
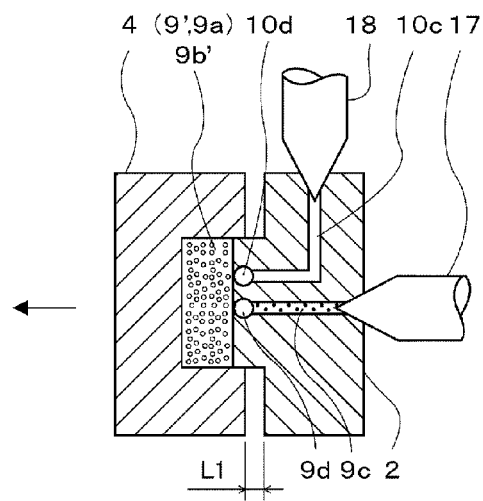
FIG. 1C is a schematic cross-sectional view illustrating a mold cavity expansion step of the injection molding method according to the first embodiment.

After the start of the first injection filling step (that is, during the first injection filling step or after the completion of the first injection filling step), as illustrated in FIG. 1C, the volume of the mold cavity 9a is expanded to the volume of the product to cause the surface layer foamable molten resin 9b' to foam (mold cavity expansion step or surface layer resin expansion foaming and molding step). The mold cavity expansion step is a step that opens the movable mold 4 in the direction away from the fixed mold 2 by a small quantity of mold opening L1 using a mold opening and closing mechanism (not illustrated) after closing the gate valve 9d of the surface layer resin flow path 9c to make the volume of the mold cavity 9a substantially the same as the volume of the product. By the mold cavity expansion step, as illustrated in FIG. 2A, the surface layer 9' formed by the surface layer foamable molten resin 9b' is formed as a foam molded product including the skin layer 9e and a foaming layer 9f made of the foam cell.

Figure 1D:
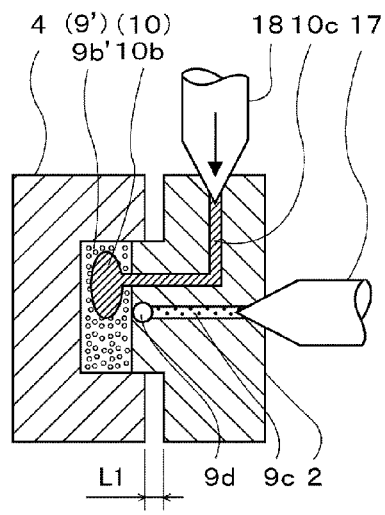
FIG. 1D is a schematic cross-sectional view illustrating a second injection filling step of the injection molding method according to the first embodiment.

After the completion of the first injection filling step, and after the start of the mold cavity expansion step (that is, during the mold cavity expansion step, or after the completion of the mold cavity expansion step), as illustrated in FIG. 1D, the gate valve 10d of the inner layer resin flow path 10c is opened to cause the inner layer non-foamable molten resin 10b forming the inner layer 10 to pass through the skin layer (cooling solidification layer) 9e of the surface layer foamable molten resin 9b' formed on a contact surface between the surface layer foamable molten resin 9b' and the inner surface of the mold cavity 9a from the second injection unit 18 via the inner layer resin flow path 10c, and to inject and fill the inner layer non-foamable molten resin 10b into the foaming layer 9f of the surface layer foamable molten resin 9b' (second injection filling step). FIG. 2B illustrates the flow state of the inner layer non-foamable molten resin 10b at the time of the start of the second injection filling step, and FIG. 2C illustrates the flow state at the time of the completion thereof.

Figure 1E:
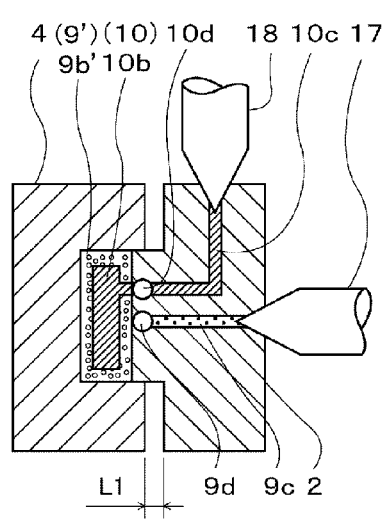
FIG. 1E is a schematic cross-sectional view illustrating a cooling and solidification step of the injection molding method according to the first embodiment.
Figure 1F:
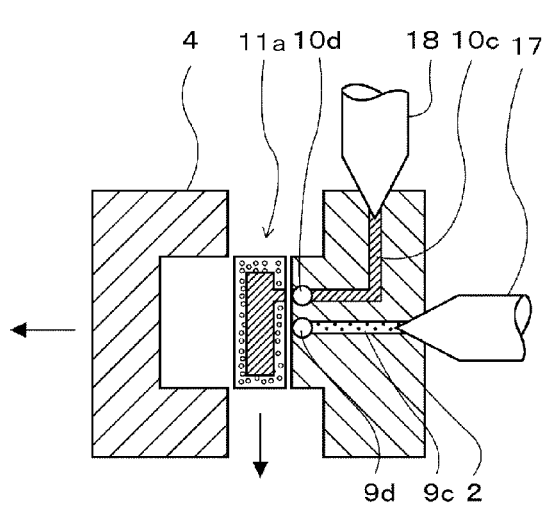
FIG. 1F is a schematic cross-sectional view illustrating a product take-out step of the injection molding method according to the first embodiment.

After the injection filling of the inner layer non-foamable molten resin 10b into the surface layer foamable molten resin 9b' is completed, as illustrated in FIG. 1E, the gate valve 10d of the inner layer resin flow path 10c is closed, and a sandwich molded product 11a formed in the mold cavity 9a is cooled and solidified in a state in which a predetermined mold clamping force is applied thereto (cooling and solidification step). Moreover, after the cooling solidification of the sandwich molded product 11a molded within the mold cavity 9a is completed, as illustrated in FIG. 1F, the movable mold 4 is opened from the fixed mold 2 by a mold opening and closing mechanism (not illustrated), the sandwich molded product 11a is transported to the outside of the injection molding machine by a product take-out unit (not illustrated), and the molding cycle is completed.

Here, as in the injection molding method according to the first embodiment, in the form in which two injection units are connected to the fixed mold 2, or in the form in which one injection unit is connected to the fixed mold 2, since a gate trace (gate mark, injection mark) is generally transferred to the fixed mold 2 side of the sandwich molded product 11*a*, the fixed mold 2 side serves as a non-design surface, and the opposite movable mold 4 side serves as a design surface. For that reason, when the product is taken out, the product is extruded from the mold by a product extrusion unit and the like from the fixed mold 2 side serving as the non-design surface. However, in the injection molding method according to the first embodiment, a great difference does not occur in the above-mentioned effects by the difference in the forms as to how two or one injection unit is arranged, which of the fixed mold 2 and the movable mold 4 is connected to two or one injection unit, or which of the fixed mold 2 side and the movable mold 4 side of the sandwich molded product is the design surface or the non-design surface, and the injection molding method can also be implemented in such different forms.

As described above, in a case where the surface layer molten resin is the surface layer foamable molten resin 9*b*' containing the foaming agent, if necessary, by adopting the gas counter pressure method to repeat the steps from FIG. 1A to FIG. 1F, even when the filling ratio of the inner layer non-foamable molten resin 10*b* to the surface layer foamable molten resin 9*b*' is set to be higher than the case of adopting the non-foamable molten resin containing no foaming agent as the surface layer molten resin, it is possible to continuously mold the sandwich molded product 11*a* with the excellent exterior characteristics of product, while suppressing the resin reversal failure. Furthermore, in the injection molding method according to the first embodiment, in the general sandwich injection molding method, the foamable molten resin containing the foaming agent rarely used in the surface layer molten resin due to the problem such as the exposure of the foam cell to the skin layer can be used as the surface layer molten resin, by substantially uniformly applying the mold clamping force to substantially the entire surface of the foamable molten resin containing the foaming agent to suppress the exposure of the foam cell to the skin layer when molding the skin layer, by the injection filling step performed by reducing the volume of the mold cavity compared to the product volume so that the injection filling rate is substantially 100%. For that reason, for the general sandwich molded product that uses the non-foamable molten resin containing no foaming agent as the surface layer molten resin, it is possible to mold a sandwich molded product in which the filling ratio of the inner layer molten resin to the product volume is greatly improved.

The injection molding method according to the first embodiment as described above is able to reliably prevent the occurrence of resin reversal failure compared to the injection molding method of the related art of the sandwich molded product described in Patent Literatures 1 and 2.

That is, in the composite molding method described in Patent Literature 1, since the amount (volume) of injection filling in the injection filling of the first material serving as the surface layer into the mold cavity performed first is a so-called short shot that is not enough to fill the volume of the mold cavity, the interior of the mold cavity is not filled with the first material. For that reason, the skin layer formed on the contact portion with the gas having a low thermal conductivity in the mold cavity, such as a flow leading end portion of the first material, is weak against for the skin layer (cooling solidification layer) formed on the contact portion by being cooled in contact with the injected and filled first material of the molten state and the inner surface of the mold cavity having a high thermal conductivity. As a result, when the amount (volume) of injection filling of the second material serving as the inner layer is increased, and a ratio of the amount (volume) of injection filling of the second resin (inner layer) to the product volume, that is, the filling ratio of the inner layer molten resin to the product volume is set to a high level, there is a problem in that a so-called resin reversal failure occurs in which the second material is ejected from the weak skin layer portion formed in the first material. Furthermore, since the molten resins of these two types fill the mold cavity with increasing amount (volume) of injection filling of the second material filled subsequently within the first material filled with short shot in advance, the resin flow of the first material including the second material depends on the resin flow in the mold cavity. For that reason, the resin flow is disrupted in the complex product shape, the reinforcing rib structure of the back surface, the displacement portion of the thickness of the product, or the like, the resin reversal failure easily occurs, and only by the resin flow pressure unevenly applied by the free-flow of the second material freely flowing in the mold cavity after the injection, the inner surface shape of the mold cavity is transferred to the skin layer (cooling solidification layer) formed on the surface of the first material. As a result, in the resin molded product that is subjected to restrictions to make the product shape as a relatively simple shape or to shorten the resin flow length from the gate portion in which the molten resin is filled within the mold cavity to the injection cylinder in order to prevent the resin reversal failure, or that is molded by the general injection molding method in which the mold clamping force is substantially uniformly applied to the molten resin injected and filled into the mold cavity, there is a problem in that exterior characteristics of the sandwich molded product are degraded. Furthermore, the lower the filling ratio of the first material (surface layer) to the mold cavity volume (product volume) is, the longer the resin flow length of the first material including the second material is, and the resin reversal failure easily occurs. Accordingly, in order to prevent the resin reversal failure, there is a need to inject and fill the first material serving as the surface layer into the mold cavity by a predetermined amount (volume) or more, before the injection filling of the second material serving as the inner layer, and there is a problem in that it is difficult to set the filling ratio of the second resin (inner layer) to the product volume to be high.

Further, in the injection molding method described in Patent Literature 2, in the gate portion in which the molten resin is filled into the mold cavity, since a second runner for the inner layer resin is arranged so as to be concentric to the center of a first runner for the surface layer resin, a laminar flow is formed in which the inner layer resin flows concentrically in the center of the surface layer resin. However, the first and second runners are hot runners including a thermal insulation and heating unit for causing the molten resin therein to flow in the molten state and holding the molten resin, and in order to concentrically arrange both runners, the arrangements and the configurations of the hot runners in the mold from the injection device to the gate portion communicating with the mold cavity become complicated. For that reason, there is a problem in that the mold structure becomes complicated, and the resin pressure loss increases by an increase in the resin flow length, which leads to a decrease in the injection filling characteristics. Further, when a gate valve (resin cutoff opening changeover valve) is provided in the gate portion, since the laminar flow formed especially is disturbed by the passage of the gate valve, such a configuration may not be adopted in the mold with the gate valve. Further, even in the injection molding method described in Patent Literature 2, the injection filling of the surface layer resin serving as the surface layer into the mold cavity performed first is short shot, and even when the surface layer resin and the inner layer resin are injected from the gate portion by the laminar flow, as in the injection molding method disclosed in Patent Literature 1, since the resin flow of the surface layer resin including the inner layer resin after the gate portion depends on the resin flow in the mold cavity, it is difficult to sufficiently suppress the occurrence of the resin reversal failure in the complex product shape, the reinforcing rib structure of the back surface, the displacement portion of the thickness of the product, or the like. This is also true for a case where the injection molding is performed within the mold cavity via a mixing nozzle configured to couple leading end portions of the plurality of injection units in order to form the laminar flow, as one of the simultaneous molding methods. Moreover, problems caused by the short shot except for the resin reversal failure are not fully solved. In addition, in the injection molding method described in Patent Literature 2, a gate "skin-limited gate" through which only the surface layer passes is disposed on a part having difficulty in configuring in a multi-layer structure (for example, a partition plate portion of a beer case, a hinge portion as seen in a cover portion of OA equipment, home appliances, or a copier), and such a thinned portion is not daringly assumed to be the multi-layer structure and is formed only from the surface layer resin, which makes it possible to avoid the resin reversal failure. With the configuration, there is a possibility that the resin reversal failure in the thinned portion having difficulty in configuring the multi-layer structure can be avoided, but a thinned portion such as a reinforcing rib structure and a product embedding clip seat structure is arranged on the back surfaces of most resin molded products. Thus, considering the situation where further tinning is required for the purpose of the weight reduction, by the addition of "skin-limited gate" to the thinned portion, there is also need to add a hot runner connected thereto, and the configuration and the arrangement of the hot runner become increasingly complicated. Furthermore, hitherto, there has been a problem in that the formation of the inner layer to the thinned portion hard to be molded is not taken into consideration, and it is difficult to expect an improvement in the filling ratio of the inner layer molten resin to the product volume required for many sandwich molded products.

In contrast, according to the injection molding method according to the first embodiment, in the first injection filling step, by reducing the volume of the mold cavity $9a$ than the product volume so that the injection filling rate is substantially 100%, the interior of the reduced mold cavity $9a$ is filled with the surface layer foamable molten resin $9b'$, and the mold clamping force is substantially uniformly applied to the surface layer foamable molten resin $9b'$ in the mold cavity $9a$. Thus, the resin pressure of the surface layer foamable molten resin $9b'$ in the mold cavity $9a$ is increased substantially uniformly, the solid skin layer (cooling solidification layer) cooled and solidified by the contact with the inner surface of the mold cavity $9a$ is formed on substantially the entire surface of the surface layer foamable molten resin $9b'$, the outflow of the inner layer non-foamable molten resin $10b$ to the outside of the surface layer to be injected and filled into the surface layer foamable molten resin $9b'$ later, a so-called resin reversal failure is suppressed, and high transferability of the mold cavity surface to the skin layer is secured. In this way, according to the injection molding method according to the first embodiment, as in the injection molding methods in Patent Literatures 1 and 2, only by the resin flow pressure unevenly applied by the free-flow of the surface layer molten resin freely flowing in the mold cavity after the injection, exterior characteristics of the product are improved for the sandwich molded product formed by the injection molding method of the general sandwich molded product in which the inner surface shape of the mold cavity is transferred to the skin layer (cooling solidification layer) formed on the surface of the surface layer molten resin.

Furthermore, according to the injection molding method according to the first embodiment, in the mold cavity expansion step, the volume of the mold cavity $9a$ is substantially already the same as the product volume. For this reason, in the injection molding method according to the first embodiment, there is no volume change of the mold cavity $9a$, and for a case where there is a volume change of the mold cavity such as the injection molding method of Patent Literature 4, the injection filling resistance of the inner layer molten resin is reliably degraded before the second injection filling step to generate an effect of decreasing the disturbance of the resin flow generated in the complex product shape, the reinforcing rib structure on the back surface, the displacement portion of the thickness of the product, or the like, which contributes to the decrease of the injection filling resistance of the inner layer molten resin and is able to improve the inhibitory effect of the resin reversal failure of the inner layer molten resin.

Furthermore, according to the injection molding method according to the first embodiment, the strength and the concentration of the foaming layer $9f$ of the surface layer foamable molten resin $9b'$ are low in a state of being filled with the non-foamable molten resin containing no foaming agent. For this reason, as illustrated in FIG. 2B, when the inner layer non-foamable molten resin $10b$ is allowed to pass the skin layer $9e$ and is injected and filled into the foaming layer $9f$ of the surface layer foamable molten resin $9b'$, the inner layer non-foamable molten resin $10b$ compresses and fills the foaming gas in the foam cell by the injection pressure and the resin flow, or substitutes the foam cell for the inner layer non-foamable molten resin $10b$, while sequentially destroying the foam cell from the site in which the strength and the concentration of the foaming layer $9f$ are weak. In this way, in the injection molding method according to the first embodiment, since only the foaming layer $9f$ is filled and substituted with the inner layer non-foamable molten resin $10b$, the resin reversal failure is suppressed, there are provided an excellent flow effect capable of specifying the filling and substitution portion of the inner layer non-foamable molten resin $10b$, and a filling ratio control effect of the inner layer non-foamable molten resin $10b$ with respect to the product volume in which the concentration decrease of the foaming layer $9f$ is substantially the same as an amount (volume) of filling and substitution of the inner layer non-foamable molten resin $10b$. For that reason, by the expansion ratio control for controlling the foam cell concentration of the foaming layer by the slight mold opening control, it is possible to perform the filling ratio control of the inner layer non-foamable molten resin $10b$ with respect to the product volume, and as long as the volume of the mold cavity $9a$ is expanded by a movable core or the like in the mold to form the foaming layer only in the portion to be filled with the inner layer non-foamable molten resin $10b$, it is possible to perform the selective flow that fills a certain portion with the inner layer non-foamable molten resin $10b$ by the priority flow effect. In this way, according to the injection molding method according to the first embodiment, in the second injection filling step, since the inner layer non-foamable molten resin 10b is injected and filled into the foaming layer 9f made of the foam cell having the weak strength and concentration, compared to the case of using a non-foamable molten resin containing no foaming agent as the surface layer molten resin, the injection filling resistance of the inner layer non-foamable molten resin 10b is greatly reduced, it is possible to reliably prevent the resin reversal failure of the inner layer non-foamable molten resin 10b by the synergistic effect with the priority flow effect of the inner layer non-foamable molten resin 10b due to the foaming layer 9f, and it is possible to set the high filling ratio of the inner layer non-foamable molten resin 10b to the product volume. Furthermore, the resin reversal failure is further suppressed by the solid skin layer 9e formed on substantially the entire surface of the surface layer foamable molten resin 9b', and the high transferability to the skin layer 9e is secured.

Herein, in the case of using a chemical foaming agent, the foaming gas pressure in the foam cell within the formed foaming layer differs depending on the types of chemical foaming agent and the molding conditions, but a general range thereof is 0.3 to 0.5 MPa (resin temperature 200° C.). In contrast, the injection filling resin pressure (injection pressure) differs depending on the types of resin and the molding conditions, but a general range thereof is 30 MPa to 50 MPa or more. In the first injection filling step of the first embodiment, due to the large pressure difference between the foaming gas pressure in the foam cell and the injection filling resin pressure, the foaming gas in the foam cell does not become a factor that increases the injection filling resistance at the time of the injection filling of the inner layer molten resin into the foaming layer, most of the foaming gas in the foam cell is easily compressed to the volume to the extent that does not affect the product quality at all and remains in the inner layer molten resin, and a small part thereof and the debris of the destroyed foam cell are melted again in the inner layer molten resin, are cooled and solidified while being incorporated into the inner layer molten resin, and no longer exist as a foaming gas. As a result, depending on the combination of resin used, the product shape and the molding conditions, as illustrated in FIG. 2C, it is possible to substantially completely substitute the volume of the foaming layer 9f (concentration reduction of the foaming layer 9f or the expansion ratio for a case where the foaming layer 9f is not a foaming layer but a molten layer) with the inner layer non-foamable molten resin 10b. For that reason, by controlling the volume (concentration reduction or expansion ratio) of the foaming layer 9f and the thickness of the skin layer 9e, it is possible to control the filling ratio of the inner layer non-foamable molten resin 10b to the product volume. As in the first embodiment, the surface layer 9' may be formed as a layer mixed with the skin layer 9e and a part of the foaming layer 9f, without substantially completely substituting the foaming layer 9f with the inner layer non-foamable molten resin 10b.

Furthermore, according to the injection molding method according to the first embodiment, in the second injection filling step, since the inner layer non-foamable molten resin 10b is caused to pass through the skin layer (cooling solidification layer) 9e of the surface layer foamable molten resin 9b' from the inner layer resin flow path 10c different from the surface layer foamable molten resin 9b' and is injected and filled into the surface layer foamable molten resin 9b', there is no need for a laminar flow forming unit such as a mixing nozzle in the injection unit. Furthermore, even when the resin flow paths 9c and 10c in the mold of the molten resin are the hot runners, the resin flow paths are not complex as in a structure for forming a laminar flow by the arrangement, the configuration, or the like, and it is possible to inject and fill the inner layer non-foamable molten resin 10b into the surface layer foamable molten resin 9b' from any multiple sites. In addition, since the inner layer non-foamable molten resin 10b is caused to pass through the skin layer (cooling solidification layer) 9e of the surface layer foamable molten resin 9b' by the injection force from the gate portion in which the inner layer resin flow path 10c is connected into the mold cavity 9a, the mold does not require a special gate structure, a special gate valve, or the like for injecting and filling the inner layer non-foamable molten resin 10b into the surface layer foamable molten resin 9b'.

Second Embodiment

Figure 3A:
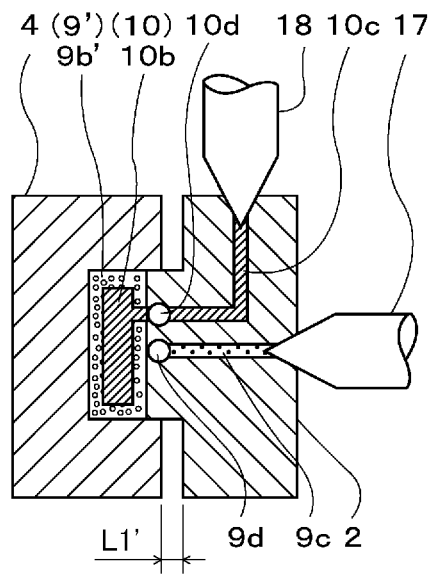
FIG. 3A is a schematic cross-sectional view illustrating a second injection filling step of an injection molding method according to a second embodiment of the invention.
Figure 3B:
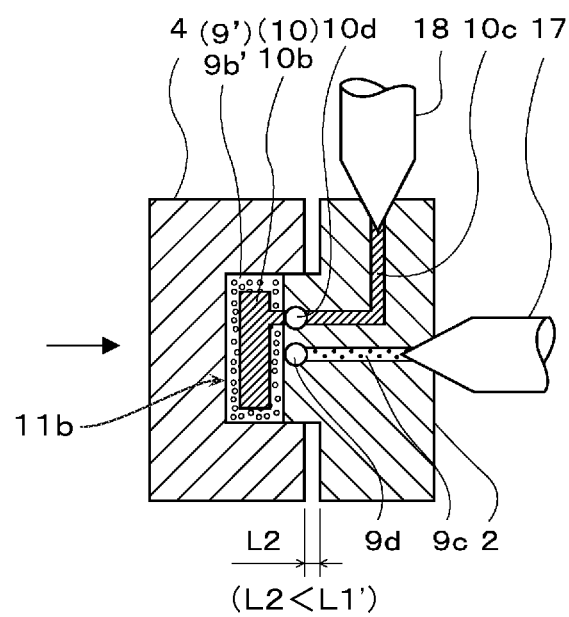
FIG. 3B is a schematic cross-sectional view illustrating a mold cavity reduction step of the injection molding method according to the second embodiment.

Next, an injection molding method according to the second embodiment of the invention will be described with reference to FIGS. 3A and 3B. FIGS. 3A and 3B are schematic cross-sectional views of a mold illustrating a step different from the injection molding method according to the first embodiment described above, in the injection molding method according to the second embodiment.

The injection molding method according to the second embodiment is different from the injection molding method according to the first embodiment in that the mold cavity expansion step is a step of expanding the mold cavity 9a so that the volume of the mold cavity 9a becomes the volume greater than the volume of the product, and the method includes a mold cavity reduction step of reducing the volume of the mold cavity 9a to the volume of the product after the completion of the mold cavity expansion step, and after the start of the second injection filling step (that is, during the second injection filling step, or after the completion of the second injection filling step). Since the molding steps other than this step are basically the same as the injection molding method according to the first embodiment, and it is possible to use basically the same mold and injection molding machine as those described in the first embodiment, the description will be given of only differences from the injection molding method according to the first embodiment.

FIG. 3A illustrates a state immediately after the mold cavity expansion step and the second injection filling step are completed, and the gate valve 10d of the inner layer resin flow path 10c is closed. In the injection molding method according to the second embodiment, the mold cavity expansion step is a step of opening the movable mold 4 in the direction away from the fixed mold 2 by a mold opening and closing mechanism (not illustrated) by a small quantity of mold opening L1' larger than a small quantity of mold opening L1, thereby making the volume of the mold cavity 9a greater than the volume of the product.

In the state illustrated in FIG. 3A, the inner layer non-foamable molten resin 10b is still maintained in the molten state. In addition, in the foaming layer 9f of the surface layer foamable molten resin 9b', the foam cell is substituted with the inner layer non-foamable molten resin 10b at a desired ratio depending on the type of resin, the product shape, the specifications of the product, and the like (the filling ratio of the inner layer molten resin to the product volume, weight reduction, uniformity, strength rigidity, and the like). However, the foaming layer 9f formed on the thinned portion such as the reinforcing rib of the product (not illustrated) is not yet in the state of being substituted with the inner layer non-foamable molten resin 10b. Moreover, after the completion of the mold cavity expansion step illustrated in FIG. 3A, from the state immediately after the second injection filling step is completed or from the state in the middle of the second injection filling step (state of FIG. 1D of the first embodiment), as illustrated in FIG. 3B, the movable mold 4 is clamped to the fixed mold 2 side by the mold opening and closing mechanism (not illustrated) until the small quantity of mold opening L1' is changed to L2, thereby reducing the volume of the mold cavity 9a (mold cavity reduction step). The volume of the mold cavity 9a in the clamped state until the small quantity of mold opening L1' is changed to L2 is substantially the same as the product volume. By the mold cavity reduction step, the increased inner layer non-foamable molten resin 10b flows and is filled to the foam cell portion of the foaming layer 9f that has lower injection filling resistance in the surface layer foamable molten resin 9b' and is not substituted with the inner layer non-foamable molten resin 10b, or the inner layer non-foamable molten resin 10b is substituted while destroying the foam cell, and the filling resistance of the foam cell portion having the lower injection filling resistance increases. Moreover, when the volume of the mold cavity 9a is substantially the same as the product volume, the inner layer non-foamable molten resin 10b is also filled in the foam cell portion of the thinned portion such as the reinforcing rib of the product, and the inner layer non-foamable molten resin 10b is filled substantially uniformly over substantially the entire surface of the product.

Moreover, after the cooling solidification of the sandwich molded product 11b formed in the mold cavity 9a has been completed from the state illustrated in FIG. 3B, as in the injection molding method according to the first embodiment, the movable mold 4 is opened from the fixed mold 2 by a mold opening and closing mechanism (not illustrated), the sandwich molded product 11b is transported to the outside of the injection molding machine by a product take-out unit (not illustrated), and the molding cycle is completed.

According to the injection molding method according to the second embodiment, as in the injection molding method according to the first embodiment, the resin reversal failure of the inner layer non-foamable molten resin 10b is suppressed by the solid skin layer 9e formed on substantially the entire surface of the surface layer foamable molten resin 9b' in the first injection filling step.

Further, in the injection molding method according to the second embodiment, since the mold cavity expansion step is a step for expanding the volume of the mold cavity by a specified quantity greater than the product volume, compared to a case where the volume is expanded to the product volume as in injection molding method according to the first embodiment, the reduction effect of the injection filling resistance in the second injection filling step can be further improved to improve the injection filling characteristics of the inner layer non-foamable molten resin 10b, and it is possible to further reduce the concentration of the foaming layer 9f by the volume expansion of the mold cavity 9a to physically increase the amount (volume) of injection filling of the inner layer non-foamable molten resin 10b capable of being injected and filled. Furthermore, although depending on all conditions, the skin layer thickness formed in a portion with a product thickness of 1 mm is generally 0.4 to 0.5 mm at one side, and it is very difficult to fill the inner layer molten resin into the surface layer molten resin in this state. However, if the portion with the product thickness of 1 mm is temporarily expanded to 1.5 to 2 mm by the expansion of the mold cavity volume, it is possible to fill the inner layer molten resin into this portion. A quantity of expansion of the mold cavity volume to be extended temporarily may be suitably selected by the mold construction, the product shape, the filling ratio of the inner layer molten resin to the product volume, or the like.

Furthermore, in the injection molding method according to the second embodiment, since it is possible to cause the increased inner layer molten resin to flow to the site with the low injection filling resistance by the mold cavity reduction step of reducing the volume of the mold cavity to the product volume, it is possible to fill the inner layer molten resin even in the thinned portion having difficulty in filling the inner layer molten resin such as the reinforcing rib of the product. In addition, as a result, it is possible to set a high filling ratio of the inner layer molten resin to the product volume. Furthermore, in the injection molding method according to the second embodiment, since it is possible to apply a substantially uniform mold clamping force to the sandwich molded product by the mold cavity reduction step, it is possible to expect the same effects as the injection compression molding method and the injection press molding method that reduce the residual stress of the sandwich molded product to suppress the deformation of the molded product at the time of the cooling solidification.

Third Embodiment

Figure 4A:
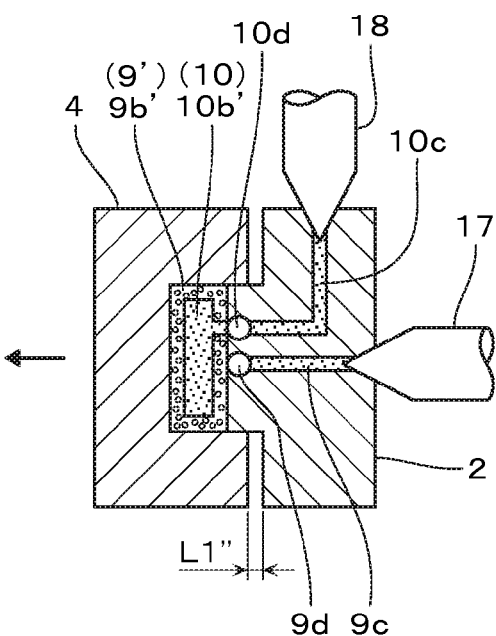
FIG. 4A is a schematic cross-sectional view illustrating a second injection filling step of an injection molding method according to a third embodiment of the invention.
Figure 4B:
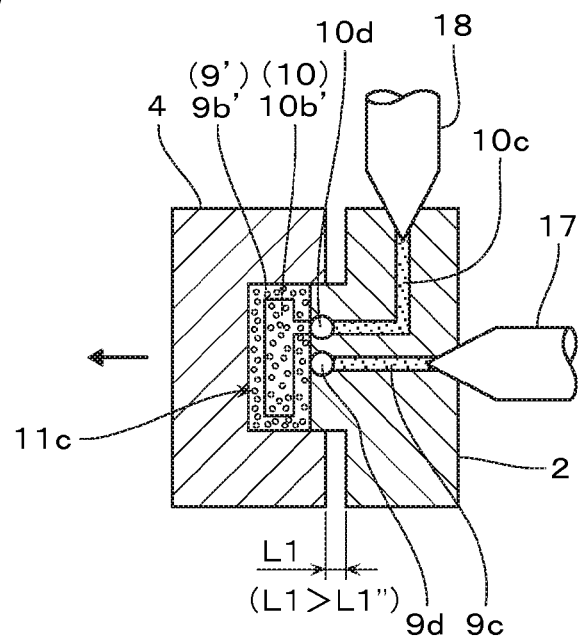
FIG. 4B is a schematic cross-sectional view illustrating a mold cavity re-expansion step of the injection molding method according to the third embodiment.

Next, an injection molding method according to the third embodiment of the invention will be described with reference to FIGS. 4A and 4B. FIGS. 4A and 4B are schematic cross-sectional views of a mold illustrating a step different from the injection molding method according to the first embodiment described above, in the injection molding method according to the third embodiment.

The injection molding method according to the third embodiment is different from the injection molding method according to the first embodiment in that the mold cavity expansion step is a step of expanding the mold cavity 9a so that the volume of the mold cavity 9a is less than the volume of the product, the inner layer non-foamable molten resin is the inner layer foamable molten resin 10b' containing the foaming agent, and the method includes a mold cavity re-expansion step of expanding the mold cavity 9a again so that the volume of the mold cavity 9a becomes the volume of the product after the start of the second injection filling step (that is, during the second injection filling step or after the completion of the second injection filling step). Since the molding steps other than this step are basically the same as the injection molding method according to the first embodiment, and it is possible to use basically the same mold and injection molding machine as those described in the first embodiment, the description will be given of only differences from the injection molding method according to the first embodiment.

FIG. 4A illustrates a state immediately after the mold cavity expansion step and the second injection filling step are completed and the gate valve 10d of the inner layer resin flow path 10c is closed. In the injection molding method according to the third embodiment, the mold cavity expansion step is a step of opening the movable mold 4 in the direction away from the fixed mold 2 by a mold opening and closing mechanism (not illustrated) by a small quantity of mold opening L1" smaller than a small quantity of mold opening L1, thereby making the volume of the mold cavity 9a less than the volume of the product. Furthermore, in the injection molding method according to the third embodiment, a second material to be injected and filled in the second injection filling step is the inner layer foamable molten resin 10b' containing the foaming agent.

Moreover, after the start of the second injection filling step (that is, during the second injection filling step or after the completion of the second injection filling step), as illustrated in FIG. 4B, the mold cavity 9a is expanded again so that the volume of the mold cavity 9a becomes the volume of the product (mold cavity re-expansion step). As a result, the inner layer foamable molten resin 10b' filled into the surface layer foamable molten resin 9b' is caused to foam.

Thereafter, after the cooling solidification of the sandwich molded product 11c formed in the mold cavity 9a has been completed from the state illustrated in FIG. 4B, as in the injection molding method according to the first embodiment, the movable mold 4 is opened from the fixed mold 2 by a mold opening and closing mechanism (not illustrated), the sandwich molded product 11c is transported to the outside of the injection molding machine by a product take-out unit (not illustrated), and the molding cycle is completed.

In the injection molding method according to the third embodiment, by performing the mold cavity re-expansion step, it is possible to actively control the foaming state (the foaming layer thickness, the expansion ratio and the like) of the inner layer molten resin that is filled into the surface layer molten resin and cannot but depend on the resin flow and the foaming state of the foamable molten resin containing the foaming agent, in the injection molding method of the sandwich molded product of the related art.

In the injection molding method according to the third embodiment, as in the injection molding method according to the second embodiment, it is preferable to perform the mold cavity reduction step. In this case, the mold cavity reduction step may be even performed after either of the mold cavity expansion step or the mold cavity re-expansion step, and may be performed after the mold cavity expansion step and the mold cavity re-expansion step, respectively. In addition, in the case of performing the mold cavity reduction step after the mold cavity expansion step, as described in the injection molding method according to the second embodiment, the expansion of the mold cavity 9a may be performed in the mold cavity expansion step, as much as a quantity to be reduced by the mold cavity reduction step. Furthermore, it is also true for the case of performing the mold cavity reduction step after the mold cavity re-expansion step and the expansion of the mold cavity 9a may be performed as much as reduction by the mold cavity reduction step.

Fourth Embodiment

Next, an injection molding method according to the fourth embodiment of the invention will be described with reference to FIGS. 5A to 5E, and FIGS. 6A and 6B.

FIGS. 5A to 5E are schematic cross-sectional views of a mold illustrating each step of the injection molding method of the sandwich molded product according to the fourth embodiment. FIGS. 6A and 6B are schematic cross-sectional views illustrating a process in which a sandwich molded product is molded.

The injection molding method according to the fourth embodiment is different from the injection molding method according to the first embodiment in that the surface layer molten resin is a non-foamable molten resin containing no foaming agent. Since the molding steps other than this step are basically the same as the injection molding method according to the first embodiment, the detailed description thereof will not be presented. Furthermore, since it is possible to use basically the same mold and injection molding machine as those described in the first embodiment except that the surface layer foamable molten resin containing the foaming agent is changed to the surface non-foamable molten resin 9b containing no foaming agent, the description thereof will not be presented.

Figure 5A:
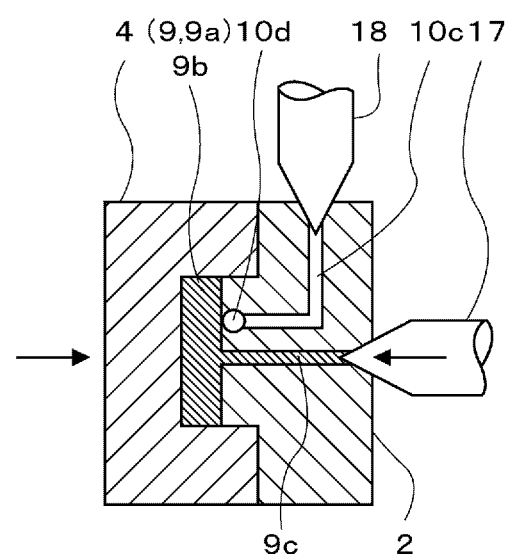
FIG. 5A is a schematic cross-sectional view illustrating a first injection filling step of an injection molding method according to a fourth embodiment of the invention.
Figure 6A:
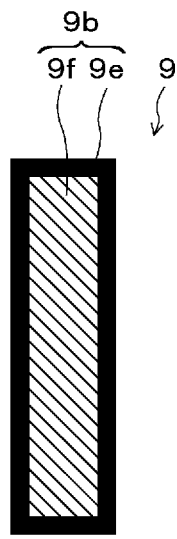
FIG. 6A is a schematic cross-sectional view illustrating a state of a surface layer non-foamable molten resin in the mold cavity expansion step of the injection molding method according to the fourth embodiment.
Figure 6B:
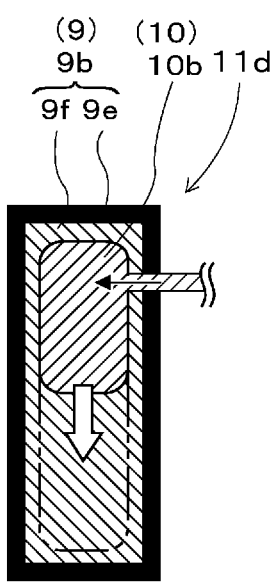
FIG. 6B is a schematic cross-sectional view illustrating a flow state of the inner layer non-foamable molten resin at the time of the start of the second injection filling step of the injection molding method according to the fourth embodiment.

In the injection molding method according to the fourth embodiment, first, the mold clamping step and the first injection filling step are performed by a method similar to the injection molding method according to the first embodiment to form the mold cavity 9a having the volume less than the volume of the product, and the interior of the mold cavity 9a is filled with the surface layer non-foamable molten resin 9b (FIG. 5A). Even in the injection molding method according to the fourth embodiment, as in the injection molding method according to the first embodiment, since the injection filling rate of the surface layer non-foamable molten resin 9b is approximately 100%, as illustrated in FIG. 6A, substantially the entire surface of the surface layer non-foamable molten resin 9b is cooled in contact with the inner surface of the mold cavity 9a, and the surface layer 9 including the solid skin layer (cooling solidification layer) 9e covering substantially the entire surface and the molten layer 9f in which the interior is in the molten state is molded. Furthermore, since the mold clamping force is applied substantially uniformly to the surface layer non-foamable molten resin 9b within the mold cavity 9a and high transferability of the inner surface of the mold cavity 9a to the skin layer is secured, exterior characteristics of the product of the sandwich molded product are improved.

Figure 5B:
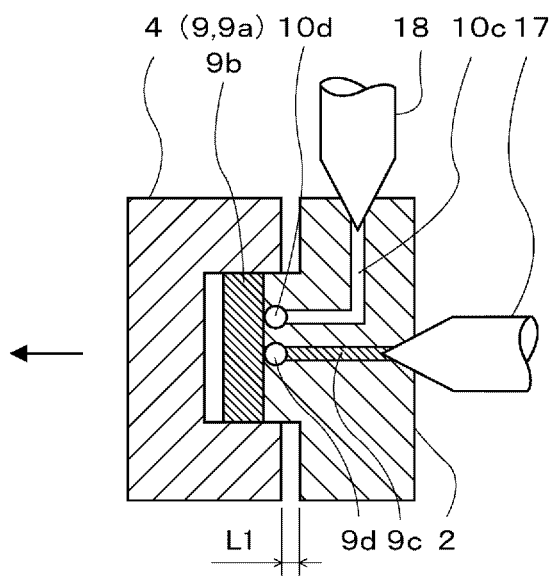
FIG. 5B is a schematic cross-sectional view illustrating a mold cavity expansion step of the injection molding method according to the fourth embodiment.
Figure 5C:
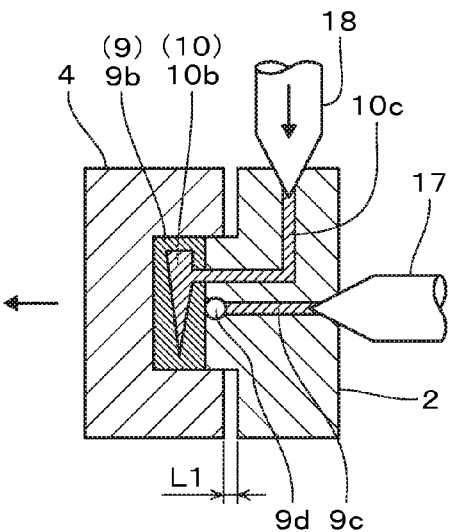
FIG. 5C is a schematic cross-sectional view illustrating a second injection filling step of the injection molding method according to the fourth embodiment.

Next, as illustrated in FIG. 5B, after the start of the first injection filling step (that is, during the first injection filling step or after the completion of the first injection filling step), the mold cavity expansion step of expanding the volume of the mold cavity 9a to the product volume is performed. Here, in order to easily understand the mold opening operation until the movable mold 4 becomes the small quantity of mold opening L1 from the fixed mold 2, the same gap as the small quantity of mold opening L1 is illustrated between the surface layer 9 and the mold cavity 9a of the movable mold 4, but, in practice, it is preferable that the slight opening operation of the movable mold 4 be controlled in connection with the second injection filling step to be performed simultaneously with the mold cavity expansion step or after a predetermined time elapses. Specifically, as illustrated in FIG. 5C, in order to secure the formation of the solid skin layer (cooling solidification layer) of the surface layer non-foamable molten resin 9b and the high transferability to the skin layer, it is preferable that the mold opening speed, the mold position holding power or the like due to the mold opening and closing mechanism be controlled so that the quantity of mold opening of the movable mold 4, that is, the quantity of volumetric expansion of the mold cavity 9a is the same as an increase in an amount (volume) of injection filling of the inner layer non-foamable molten resin 10b to be injected and filled into the surface layer non-foamable molten resin 9b or decreases by a specified amount (volume), and the movable mold 4 be opened until the volume of the mold cavity 9a becomes the product volume, that is, becomes the small quantity of mold opening L1 so that the above-mentioned gap is not generated. Furthermore, conversely, according to the quantity of volumetric expansion of the mold cavity 9a due to the mold opening of the movable mold 4, the amount (volume) of injection filling of the inner layer non-foamable molten resin 10b in the inner layer resin injection filling step may be similarly controlled or both may be controlled in an interlocked manner.

Next, the second injection filling step is performed by a method similar to the injection molding method according to the first embodiment to inject and fill the inner layer non-foamable molten resin 10b into the surface layer non-foamable molten resin 9b (FIG. 5C). FIG. 6B illustrates the flow state of the inner layer non-foamable molten resin 10b at the time of the start of the second injection filling step. Here, by interlocking the mold cavity expansion step with the second injection filling step and maintaining the state of bringing the gate valve 10d of the inner layer resin flow path 10c into close contact with the skin layer 9e of the surface layer non-foamable molten resin 9b formed on the contact surface with the inner surface of the mold cavity 9a, it is possible to inject and fill the inner layer non-foamable molten resin 10b into the surface layer non-foamable molten resin 9b through the skin layer 9e of the surface layer non-foamable molten resin 9b, while preventing the occurrence of the resin reversal failure in the gate valve 10d. In addition, in a case where the adhesion between the gate valve 10d and the skin layer 9e of the surface layer non-foamable molten resin 9b is maintained depending on the molding conditions or the like, regardless of the interlocking between the mold cavity expansion step and the second injection filling step, there is no need to necessarily link the mold cavity expansion step with the inner layer resin injection filling step.

Figure 5D:
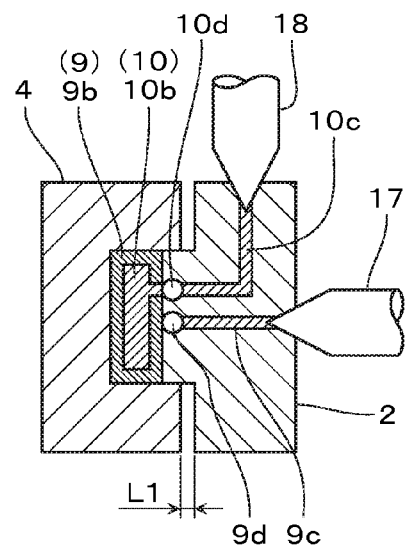
FIG. 5D is a schematic cross-sectional view illustrating a cooling and solidification step of the injection molding method according to the fourth embodiment.
Figure 5E:
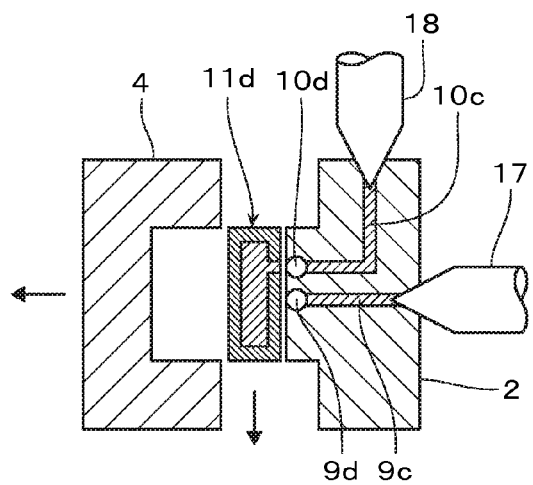
FIG. 5E is a schematic cross-sectional view illustrating a product take-out step of the injection molding method according to the fourth embodiment.

After the second injection filling step, as illustrated in FIG. 5D, the gate valve 10d of the inner layer resin flow path 10c is closed, and the process shifts to the cooling and solidification step of performing the cooling solidification in the state of applying a predetermined mold clamping force to the sandwich molded product 11d molded in the mold cavity 9a. Moreover, after the cooling solidification of the sandwich molded product 11d molded within the mold cavity 9a is completed, as illustrated in FIG. 5E, the movable mold 4 is opened from the fixed mold 2 by the mold opening and closing mechanism (not illustrated), the sandwich molded product 11d is carried out of the injection molding machine by a product take-out unit (not illustrated), and the molding cycle is completed.

As described above, by repeating the steps from FIGS. 5A to 5E, even if the high filling ratio of the inner layer molten resin to the product volume is set, it is possible to continuously mold the sandwich molded product 11d with the excellent product exterior characteristics, while suppressing the resin reversal failure.

In the injection molding method according to the fourth embodiment, by the mold cavity expansion step, the mold clamping force to the surface layer non-foamable molten resin 9b filled into the reduced mold cavity is relieved, which makes it possible to lower the pressure in the surface layer non-foamable molten resin 9b. For this reason, by lowering the injection filling resistance of the inner layer non-foamable molten resin 10b in the second injection filling step to improve the injection filling characteristics of the inner layer non-foamable molten resin 10b, it is possible to set a high filling ratio of the inner layer non-foamable molten resin 10b to the product volume. That is, in the injection molding method according to the fourth embodiment, along with an increase in the amount (volume) of injection filling of the inner layer non-foamable molten resin 10b to the surface layer non-foamable molten resin 9b, in the state where the mold cavity 9a is filled with the two molten resins, the volume of the mold cavity 9a is extended to the product volume. Thus, according to the injection molding method according to the fourth embodiment, as illustrated in FIG. 6B, the resin reversal failure is suppressed by the solid skin layer 9e formed over substantially the entire surface of the surface layer non-foamable molten resin 9b, and it is possible to secure the high transferability to the skin layer 9e. Furthermore, according to the injection molding method according to the fourth embodiment, since the injection filling resistance of the surface layer non-foamable molten resin 9b to molten layer 9f is lowered by the mold cavity expansion step, thereby making it possible to improve the injection filling characteristics of the inner layer non-foamable molten resin 10b, it is possible to perform the second injection filling step by setting a high filling ratio of the inner layer non-foamable molten resin 10b to the product volume.

Furthermore, according to the injection molding method according to the fourth embodiment, in the second injection filling step, as illustrated in FIG. 5C, the inner layer non-foamable molten resin 10b is allowed to pass through the skin layer (cooling solidification layer) 9e of the surface layer non-foamable molten resin 9b from the inner layer resin flow path 10c different from the surface layer resin flow path 9c of the surface layer non-foamable molten resin 9b, and is injected and filled into the surface layer non-foamable molten resin 9b. For this reason, the injection molding machine used for the injection molding method according to the fourth embodiment does not require a laminar flow forming unit such as a mixing nozzle or the like that couples the leading end portions of a plurality of injection units. Furthermore, even if the resin flow paths of the molten resin are the hot runners, since the flow paths do not become complicated as in a structure for forming a laminar flow by the arrangement, the configuration or the like and it is possible to shorten the resin flow length, the resin pressure loss is small and the injection filling characteristics are improved, the resin retention is less, and thus the color change characteristics are also excellent. Furthermore, it is possible to inject and fill the inner layer non-foamable molten resin 10b into the surface layer non-foamable molten resin 9b from a plurality of certain sites. Further, in order to allow the inner layer non-foamable molten resin 10b to pass through the skin layer (cooling solidification layer) 9e of the surface layer non-foamable molten resin 9b from the gate valve 10d disposed on the gate portion by which the inner layer resin flow path 10c is connected to the mold cavity 9a by the injection force, the fixed mold 2 does not require a special gate structure, a special gate value or the like for injecting and filling the inner layer non-foamable molten resin 10b into the surface layer non-foamable molten resin 9b.

Fifth Embodiment

Figure 7A:
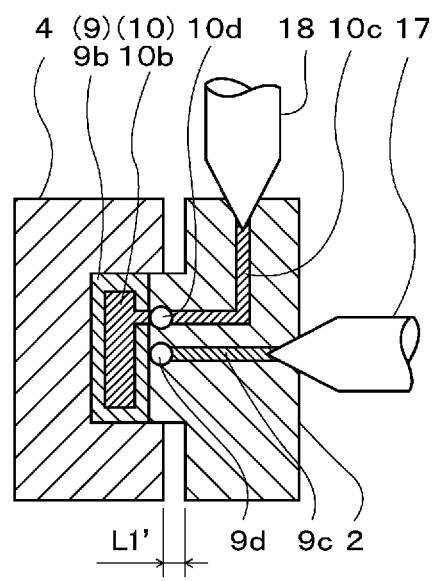
FIG. 7A is a schematic cross-sectional view illustrating a second injection filling step of an injection molding method according to a fifth embodiment of the invention.
Figure 7B:
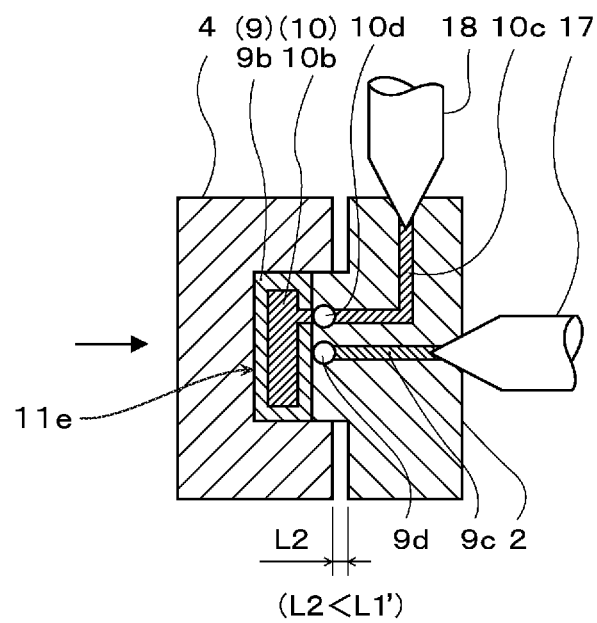
FIG. 7B is a schematic cross-sectional view illustrating a mold cavity reduction step of the injection molding method according to the fifth embodiment.

Next, an injection molding method according to a fifth embodiment of the invention will be described with reference to FIGS. 7A and 7B. FIGS. 7A and 7B are schematic cross-sectional views of a mold illustrating a step of the injection molding method according to the fifth embodiment different from the injection molding method according to the fourth embodiment described above.

The injection molding method according to the fifth embodiment is different from the injection molding method of the fourth embodiment in that the mold cavity expansion step is a step of expanding the mold cavity 9a so that the volume of the mold cavity 9a becomes greater than the volume of the product, and the method includes a mold cavity reduction step of reducing the volume of the mold cavity 9a to the volume of the product after the completion of the mold cavity expansion step, and after the start of the second injection filling step (that is, during the second injection filling step or after the completion of the second injection filling step). Since the molding steps other than this step are basically the same as the injection molding method according to the fourth embodiment, and it is possible to use basically the same mold and injection molding machine as those described in the first embodiment, the description will be given of only differences from the injection molding method according to the first and fourth embodiments. In addition, in the injection molding method according to the fifth embodiment, since the mold cavity expansion step and the mold cavity reduction step are the same as the injection molding method according to the second embodiment, the detailed description thereof will not be repeated.

FIG. 7A illustrates the state immediately after the mold cavity expansion step and the second injection filling step have been completed, and the gate valve 10*d* of the inner layer resin flow path 10*c* has been closed. In the state illustrated in FIG. 7A, the molten layer 9*f* of the surface layer non-foamable molten resin 9*b* and the inner layer non-foamable molten resin 10*b* are still maintained in the molten state. In the injection molding method according to the fifth embodiment, as in the injection molding method according to the second embodiment, the mold cavity expansion step is a step of opening the movable mold 4 in the direction away from the fixed mold 2 using a mold opening and closing mechanism (not illustrated) by the small quantity of mold opening L1' greater than the small quantity of mold opening L1, thereby setting the volume of the mold cavity 9*a* to the volume greater than the volume of the product.

Moreover, after the completion of the mold cavity expansion step illustrated in FIG. 7A, from the state immediately after the second injection filling step is completed, or the state in the middle of the second injection filling step (state of FIG. 5C of the fourth embodiment), as in the injection molding method according to the second embodiment, the movable mold 4 is clamped to the fixed mold 2 side by a mold opening and closing mechanism (not illustrated) until the small quantity of mold opening L1' is changed to L2, thereby reducing the volume of the cavity 9*a* (mold cavity reduction step). The volume of the mold cavity 9*a* at this time is substantially the same as the volume of the product. By the mold cavity reduction step, the increased inner layer non-foamable molten resin 10*b* flows and is filled to the site having the low injection filling resistance within the surface layer non-foamable molten resin 9*b*.

Moreover, from the state illustrated in FIG. 7B, after the cooling solidification of the sandwich molded product 11*e* molded in the mold cavity 9*a* has been completed, as in the injection molding method according to the first embodiment, the movable mold 4 is opened from the fixed mold 2 by a mold opening and closing mechanism (not illustrated), the sandwich molded product 11*e* is transported to the outside of the injection molding machine by a product take-out means (not illustrated), and the molding cycle is completed.

In the injection molding method according to the fifth embodiment, as in the injection molding method according to the second embodiment, since the mold cavity expansion step is a step of expanding the volume of the mold cavity by a specified quantity greater than the product volume, the reduction effect of the injection filling resistance in the second injection filling step can be further improved to improve the injection filling characteristics of the inner layer non-foamable molten resin 10*b*, and it is possible to physically increase the amount (volume) of injection filling of the inner layer non-foamable molten resin 10*b* capable of being injected and filled. Furthermore, in the injection molding method according to the fifth embodiment, as in the injection molding method according to the second embodiment, since the thinned portion such as the reinforcing rib of the product is also filled with the inner layer non-foamable molten resin 10*b* by the mold cavity reduction step, and the inner layer non-foamable molten resin 10*b* is substantially uniformly filled over substantially the entire surface of the product, it is possible to mold the sandwich molded product having the excellent product exterior characteristics. In addition, as a result, it is possible to set a high filling ratio of the inner layer non-foamable molten resin 10*b* to the volume of the product. Furthermore, since substantially uniform clamping force can be applied to the sandwich molded product 11*e* by the mold cavity reduction step, it is possible to expect the same effects as the injection compression molding method and the injection press molding method that reduce the residual stress in the sandwich molded product 11*e* to suppress the deformation of the molded product at the time of the cooling solidification. Furthermore, even in the injection molding method according to the fifth embodiment, the resin reversal failure of the inner layer non-foamable molten resin 10*b* is suppressed by the solid skin layer 9*e* formed over substantially the entire surface of the surface layer non-foamable molten resin 9*b* in the first injection filling step.

Sixth Embodiment

Next, an injection molding method according to a sixth embodiment of the invention will be described with reference to FIGS. 8A to 8F, 9A, 9B and 9C. FIGS. 8A to 8F are schematic cross-sectional views of a mold illustrating each step of the injection molding method of a hollow molded product according to the sixth embodiment. FIGS. 9A, 9B and 9C are schematic cross-sectional views illustrating a process in which the hollow molded product is molded.

The injection molding method according to the sixth embodiment is different from the injection molding method according to the first embodiment in that the injection molding method according to the first embodiment is an injection molding method of the sandwich molded product which uses the inner layer non-foamable molten resin 10*b* as a second material, whereas the injection molding method according to the sixth embodiment is an injection molding method of a hollow molded product which uses a pressurized gas 10*b''* as the second material. Since the molding steps other than this step are basically the same as the injection molding method according to the first embodiment, the detailed description thereof will not be repeated.

Figure 8A:
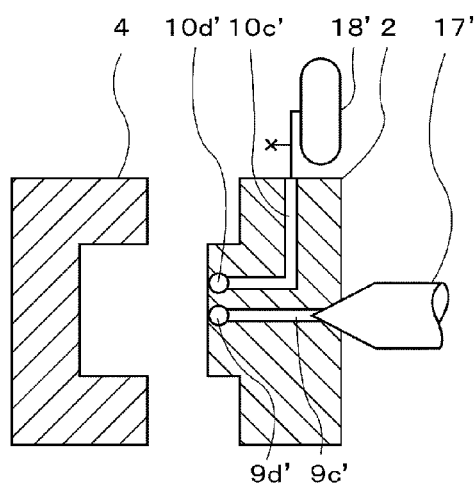
FIG. 8A is a schematic cross-sectional view illustrating a mold opening state before a molding cycle of an injection molding method according to a sixth embodiment of the invention.
Figure 9A:
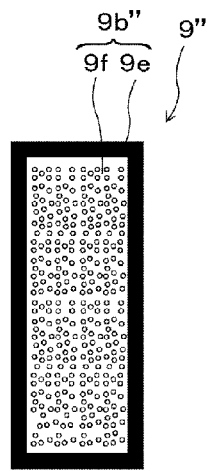
FIG. 9A is a schematic cross-sectional view illustrating a state of the foamable molten resin in the mold cavity expansion step of the injection molding method according to the sixth embodiment.
Figure 9B:
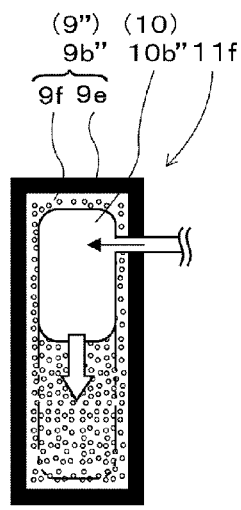
FIG. 9B is a schematic cross-sectional view illustrating a flow state of the pressurized gas in the second injection filling step of the injection molding method according to the sixth embodiment.
Figure 9C:
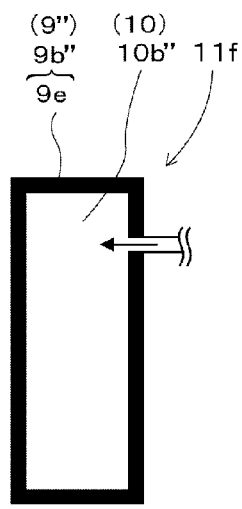
FIG. 9C is a schematic cross-sectional view illustrating a state of a hollow molded product in the cooling and solidification step of the injection molding method according to the sixth embodiment.

As illustrated in FIG. 8A, the injection molding machine used for the injection molding method according to the sixth embodiment includes the fixed mold 2 (first mold) and the movable mold 4 (second mold) that are capable of forming the mold cavity 9*a*, an injection unit 17' capable of injecting and filling the foamable molten resin 9*b''* (first material) into the mold cavity in 9*a*, and a pressurized gas unit 18' capable of supplying the pressurized gas 10*b''* (second material) into the mold cavity 9*a*.

The fixed mold 2 is mounted to a fixed platen (not illustrated) that is erected on a base (not illustrated). In addition, the fixed mold 2 has a resin flow path 9*c'* through which the foamable molten resin 9*b''* injected from the injection unit 17' flows toward the interior of the mold cavity 9*a*, a gate valve (resin cutoff opening changeover valve) 9*d'* provided in a gate portion communicating with the mold cavity 9*a* of the resin flow path 9*c'*, a pressurized gas flow path 10*c'* that pours the pressurized gas 10*b''* supplied from the pressurized gas unit 18 into the mold cavity 9*a*, and an opening and closing valve 10*d'* provided in a connection portion of the mold cavity 9*a* of the side end portion of the pressurized flow path 10*c'*. The movable mold 4 is mounted to a movable platen (not illustrated) so as to be opposed to the fixed mold 2, and is disposed so as to be movable in the longitudinal direction of the injection molding machine by a mold opening and closing mechanism (not illustrated).

The injection unit 17' is provided so as to be parallel to the longitudinal direction of the injection molding machine on the rear surface side of the fixed mold 2, and is arranged so that the leading end nozzle thereof can move forward and away from the fixed mold 2 from the back surface of the fixed platen. The pressurized gas unit 18' is a unit capable of supplying the gas such as air, nitrogen, and carbon dioxide used in a hollow portion forming step described below by a specified amount and at a predetermined pressure, and includes a tank unit and a pressure gauge relating to the tank unit, a pressure control valve, a gas flow rate control valve, a check valve, an atmosphere release valve and the like. The pressurized gas unit 18' is disposed near the injection molding machine, as a single unit including the tank unit, and is connected to the pressurized gas flow path 10*c'* of the fixed mold 2 by a pipe, a gas hose or the like. In a case where the pressurized gas is supplied from a utility pipe or the like of a plant in which the injection molding machine is installed, it is also possible to use a form that directly supplies the pressurized gas from the utility pipe and separately installs only the necessary pipe machinery as a unit, and a form that arranges the unit on the fixed platen or the like of the injection molding machine.

In the injection molding machine used for the injection molding method according to the sixth embodiment, since other configurations such as the configurations of the fixed mold 2 and the movable mold 4 are similar to the injection molding machine used for the injection molding method according to the first embodiment, the description thereof will not be repeated.

Figure 8B:
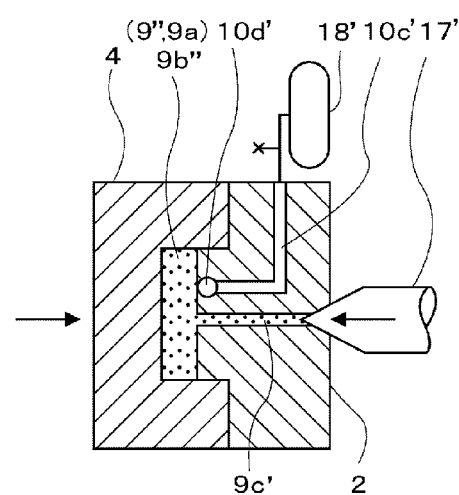
FIG. 8B is a schematic cross-sectional view illustrating a first injection filling step of the injection molding method according to the sixth embodiment.

In the injection molding method according to the sixth embodiment, from the mold opening state before the start of the molding cycle illustrated in FIG. 8A, the mold clamping step and the injection filling step are performed by a method similar to the mold clamping step and the first injection filling step of the injection molding method according to the first embodiment, thereby forming the mold cavity 9*a* having the volume less than the volume of the product and filling the interior of the mold cavity 9*a* with the foamable molten resin 9*b"* (FIG. 8B). Even in the injection molding method according to the sixth embodiment, as in the injection molding method according to the first embodiment, since the injection filling rate of the foamable molten resin 9*b"* is approximately 100%, as illustrated in FIG. 9A, substantially the entire surface of the foamable molten resin 9*b"* is cooled in contact with the inner surface of the mold cavity 9*a*, and the solid skin layer (cooling solidification layer) 9*e* covering substantially the entire surface of the foamable molten resin 9*b"* is molded. Further, as in the case of short shot, for a form in which the molten resin is filled into the mold cavity at the resin flow pressure containing the pressurized gas to be poured later, since the mold clamping force is applied substantially uniformly to the foamable molten resin 9*b"* containing the foaming agent in the mold cavity 9*a*, the high transferability of the mold cavity 9*a* to the skin layer 9*e* is secured, and the exposure of the foam cell to the skin layer 9*e* at the time of molding the skin layer 9*e* is suppressed, by the mold clamping force that is substantially uniformly applied to substantially the entire surface of the foamable molten resin 9*b"* containing the foaming agent. For that reason, as in the case of short shot, the exterior characteristics of the product are improved for the hollow molded product molded by the general hollow injection molding method in which the inner surface shape of the mold cavity is transferred to the skin layer (cooling solidification layer) formed on the molten resin surface, only by the resin flow pressure to be unevenly applied by the free flow of the molten resin freely flowing in the mold cavity after the injection by the pressurized gas to be poured later.

Since the foamable molten resin 9*b"* is cooled within the mold immediately after it is injected and filled into the mold cavity 9*a* and the cooling solidification shrinkage thereof proceeds, it is preferable to inject and fill the foamable molten resin 9*b"* more than the volume of the reduced mold cavity 9*a* at least as much as the cooling solidification shrinkage (volume), in order to secure the formation of the solid skin layer (cooling solidification layers) 9*e* of the foamable molten resin 9*b"* and the high transferability to the skin layer 9*e*. Here, although the skin layer 9*e* is strong against the skin layer formed on the contact portion with the gas within the mold cavity, the skin layer 9*e* is not a fully cured layer, but is a layer such as a thin film in which the cooling solidification is still in progress when the temperature thereof is at a resin softening point temperature or a glass solidification temperature or more and which shows the rubber-like elastic behavior in the layer direction, and is able to follow the variable of the volume of the mold cavity 9*a* by expansion and contraction.

Herein, although the foaming agent, contained in the foamable molten resin 9*b"* containing the foaming agent, is described on the assumption that it is a chemical foaming agent, as described in the first embodiment, the foaming agent may be a physical foaming agent. Furthermore, as in the injection molding method according to the first embodiment, the injection molding method according to the sixth embodiment may perform a so-called gas counter-pressure method which, after the start of the mold clamping step (that is, during the mold clamping step or after the completion of the mold clamping step), and before the start of the injection filling step, pours the pressurized gas such as air, nitrogen, and carbon dioxide into the mold cavity 9*a*, pressurizes the interior of the mold cavity 9*a* at a pressure higher than or equal to the foaming expansion pressure of the foamable molten resin 9*b"* (pressurization step), and discharges the poured pressurized gas (pressurized gas discharging step) after the start of the injection filling step (that is, during the injection filling step, or after the completion of injection filling step). When performing the expansion foaming molding by the foamable molten resin 9*b"*, it is possible to suppress the exposure of the foam cell to the skin layer (cooling solidification layer) by the molding conditions such as the mold clamping force to be applied substantially uniformly over substantially the entire surface of the foamable molten resin 9", the injection conditions, and the mold temperature control. However, in some cases, these molding conditions are complicated, and may be the contrary to the molding conditions of the hollow molded product. Even in such a case, when such a gas counter pressure method is adopted, it is possible to more reliably suppress the exposure of the foam cell to the skin layer (cooling solidification layer), and even in a hollow molded product which requires high product exterior characteristics and design characteristics, it is possible to adopt the foamable molten resin 9*b"* as the resin material of the hollow molded product. Accordingly, it is possible to expect the further weight reduction of the hollow molded product which is suitable for the weight reduction.

In the injection filling step, in a case where the gas counter pressure method is adopted, the pressurized gas used is the same as the pressurized gas to be used in the hollow portion forming step described below, and may be air, nitrogen carbon dioxide or the like. Further, the pressurized gas unit 18' is able to supply a specified amount of pressurized gas into the mold cavity 9a via a pressurized gas flow path 10c' of the fixed mold 2 and an opening and closing valve 10d' of the pressurized gas flow path 10c' at a predetermined pressure. Furthermore, the opening and closing valve 10d' is not a special opening and closing valve or the like for pouring the pressurized gas into the molten resin. For that reason, in the hollow portion forming step, as long as the pressurized gas flow path and associated mechanisms for pouring the pressurized gas into the molten resin are used in the pressurization step and the gas discharge step within the mold cavity in the gas counter pressure method, the gas counter pressure method can be adopted, without adding new configuration requirements. The pressurization step of the mold cavity in the gas counter pressure method does not overlap the pouring step of the pressurized gas in the hollow portion forming step, and there is no problem even when the each discharging step of the pressurized gas overlaps. Accordingly, even in the molding step, there is no problem even when the pressurized gas unit 18', the pressurized gas flow path 10c', and the associated mechanisms are used for the hollow portion forming step are used in the pressurization step and the gas discharge step within the mold cavity 9a in the gas counter pressure method.

Figure 8C:
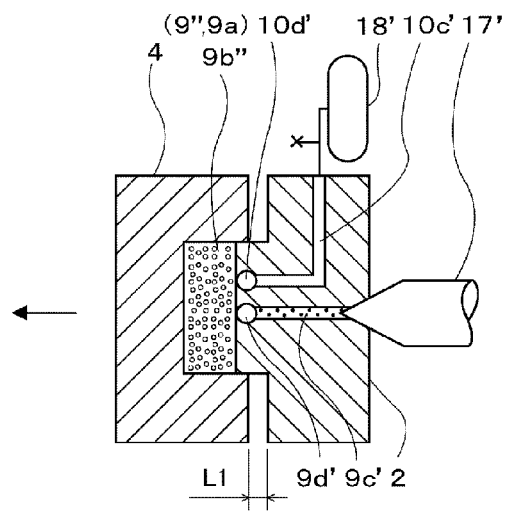
FIG. 8C is a schematic cross-sectional view illustrating a mold cavity expansion step of the injection molding method according to the sixth embodiment.

Next, as illustrated in FIG. 8C, as in the injection molding method according to the first embodiment, the mold cavity expansion step of expanding the volume of the mold cavity 9a to the product volume is performed, whereby the injected and filled foamable molten resin 9b" is formed as the foam molded product 9" including the skin layer 9e and the foaming layer 9f made of the foam cell. In the mold cavity expansion step, as in the general expansion foaming method, the small opening operation of the movable mold 4, the mold temperature or the like is controlled so that the foaming conditions such as the thickness of the skin layer 9e of the foam molded product 9" and the foaming layer 9f made of the foam cell and, the particle diameter of the foam cell, and the foaming expansion ratio become desired foaming conditions. However, in the hollow portion forming step performed below, the strength and the concentration may be actively controlled so as to be lowered so that the high hollow ratio of the hollow portion to the volume of the molded product can be set.

Figure 8D:
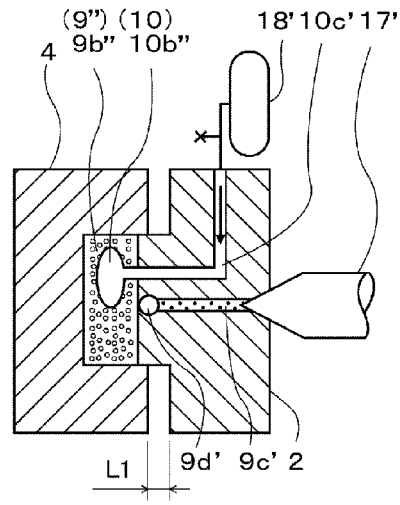
FIG. 8D is a schematic cross-sectional view illustrating a second injection filling step of the injection molding method according to the sixth embodiment.

Next, as illustrated in FIG. 8D, after the completion of the injection filling step, and after the start of the mold cavity expansion step (that is, during the mold cavity expansion step or after the completion of the mold cavity expansion step), the opening and closing valve 10d' of the pressurized gas flow path 10c' is opened, and the pressurized gas 10b" is allowed to pass through the skin layer (cooling solidification layer) 9e of the foam molded product 9" formed on the contact surface between the foamable molten resin 9b" and the inner surface of the mold cavity 9a via the pressurized gas flow path 10c' from the pressurized gas unit 18', thereby pouring the pressurized gas 10b" into the foaming layer 9f of the foam molded product 9" (hollow portion forming step or second injection filling step). FIG. 9B illustrates the flow condition of the pressurized gas in the hollow portion forming step or the second injection filling step. Since the foamable molten resin 9b" is foamed and expanded in the mold cavity 9a by the injection filling step and the mold cavity expansion step before the hollow portion forming step, that is, the expansion foaming molding step, even in the hollow portion forming step, the skin layer 9e of the foam molded product 9" is in a state of being pressed on the inner surface of the mold cavity 9a by the foaming gas pressure. Similarly, since a state where the opening and closing valve 10d' of the pressurized gas flow path 10c' is in close contact with the skin layer 9e of the molded foamed body 9" is maintained, it is possible to allow the pressurized gas 10b" to pass through the skin layer (cooling solidification layer) 9e of the foam molded product 9", while preventing the occurrence of gas rupture failure in the opening and closing valve 10d', thereby pouring the pressurized gas 10b" into the foaming layer 9f of the foam molded product 9".

Figure 8E:
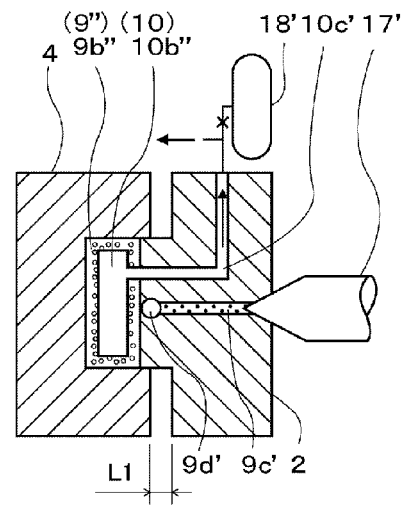
FIG. 8E is a schematic cross-sectional view illustrating a cooling and solidification step of the injection molding method according to the sixth embodiment.
Figure 8F:
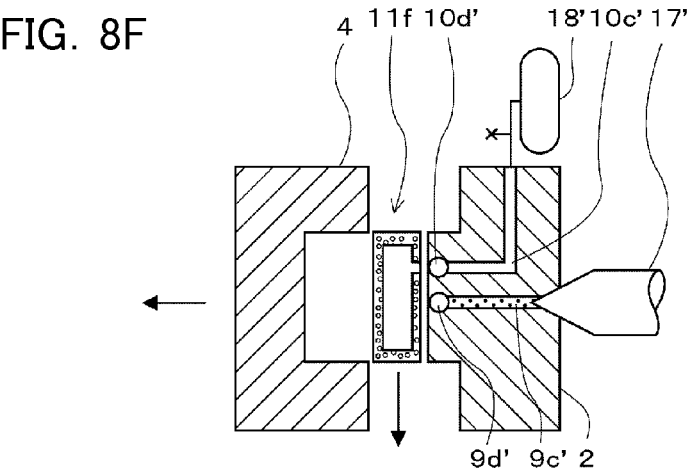
FIG. 8F is a schematic cross-sectional view illustrating a product take-out step of the injection molding method according to the sixth embodiment.

After the pouring of the pressurized gas 10b" into the foam molded product 9" is completed and a desired hollow molding portion is formed, as illustrated in FIG. 8E, the process shifts to a cooling and solidification step of cooling and solidifying the hollow molded product 11f in the state of applying a predetermined mold clamping force to the hollow molded product 11f molded in the mold cavity 9a. FIG. 9C illustrates the state of the hollow molded product in the cooling solidification step. At this time, although it is preferred that the pressurized gas supply and the supply gas control from the pressurized gas unit 18' be continued so that the mold clamping force is applied substantially uniformly on substantially the entire surface of the hollow molded product and so as to maintain the pressure required to form the hollow portion, as long as the gas pressure in the hollow portion is a predetermined pressure or more, the opening and closing valve 10d' of the pressurized gas flow path 10c' may be in the closed state. Moreover, after the start of cooling solidification step of the hollow molded product 11f molded in the mold cavity 9a (that is, during the cooling solidification step or after the completion of the cooling solidification step), an air release valve arranged in a conduit between the pressurized gas flow path 10c' and the pressurized gas unit 18 is opened, and the opening and closing valve 10d' of the pressurized gas flow path 10c' is opened, thereby discharging the pressurized gas mixed with the foaming gas in the hollow portion of the hollow molded product 11f. Moreover, as illustrated in FIG. 8F, the movable mold 4 is opened from the fixed mold 2 by a mold opening and closing mechanism (not illustrated) to transport the hollow molded product 11f to the outside of the injection molding machine by a product take-out means (not illustrated), and the molding cycle is completed.

Here, as in the injection molding method according to the sixth embodiment, in the form in which the injection unit 17' is connected to the fixed mold 2, since a gate trace (gate mark, and injection mark) of the hollow molded product 11f to is generally transferred to the fixed mold 2 side, the fixed mold 2 side serves as a non-design surface, and the movable mold 4 side serves as a design surface. For that reason, the opening and closing valve 10d', into which the pressurized gas is poured, is also disposed on the non-design surface of the fixed mold 2 side, and the pouring hole of the pressurized gas is also formed on the non-design surface of the fixed mold 2 side of the hollow molded product 11f. Furthermore, when the product is taken out, the product is extruded from the mold by a product extrusion means and the like from the fixed mold 2 side serving as a non-design surface. However, in injection molding method according to the sixth embodiment, by the difference in the forms of such as a configuration in which the injection unit is connected to one of the fixed mold 2 and the movable mold 4 or a configuration in which one of the fixed mold 2 side and the movable mold 4 side of the hollow molded product a design surface or a non-design surface, a large difference does not occur in the above-mentioned effects, and the injection molding method can also be executed in such different forms.

As described above, even when the high hollow ratio of the hollow portion to the product volume is set by adopting the gas counter pressure method if necessary to repeat the steps of FIGS. 8A to 8F, it is possible to continuously mold the hollow molded product 11f having the excellent exterior characteristics of the product, while suppressing the gas rupture failure. In a case where the gas counter pressure method is adopted, when the pressurized gas in the hollow portion of the hollow molded product 11f is discharged, since the pressurized gas in the mold cavity 9a is also simultaneously discharged, especially, there is no need for individual discharge control of the pressurized gas of the gas counter-pressure method. Further, according to the injection molding method according to the sixth embodiment, by the injection filling step performed by reducing the volume of the mold cavity than the product volume so that the injection filling rate is substantially 100%, the foamable molten resin containing the foaming agent used less frequently due to the problems such as the exposure of the foam cell to the skin layer in the general hollow injection molding method can be used by substantially uniformly applying the mold clamping force on substantially the entire surface of the foamable molten resin containing the foaming agent to suppress the exposure of the foam cell to the skin layer at the time of the formation of the skin layer. For that reason, compared to the general hollow molded product that uses the non-foamable molten resin containing no foaming agent, as described above, it is possible to mold the hollow molded product in which the hollow ratio of the hollow portion to the product volume is improved significantly.

In the injection molding method according to the sixth embodiment as described above, it is possible to reliably suppress an occurrence of the gas rupture failure compared to the injection molding method (hollow injection molding method and high hollow injection molding method) of the related art of the hollow molded product described in Patent Literatures 3 and 4.

That is, in the hollow molding method described in Patent Literature 3, since an amount of injection filling (volume) in the injection filling of the molten synthetic resin (molten resin) into the mold cavity performed first is a so-called short shot that is not enough to meet the volume of the mold cavity, the interior of the mold cavity is not filled with the molten synthetic resin. For that reason, the injected and filled molten synthetic resin is cooled in contact with the inner surface of the mold cavity having high thermal conductivity, and thus the strength of the skin layer formed in a contact portion with gas having the low thermal conductivity in the mold cavity such as a flow leading end portion of the molten synthetic resin is weak against the thin film-like skin layer (cooling solidification layer) formed on the contact portion thereof. As a result, after the injection filling of the molten synthetic resin, when the gas is ejected into the molten synthetic resin, when the rate of the hollow portion volume to the product volume, that is, the hollow ratio of the hollow portion to the product volume is set to a high level, by increasing the gas amount (volume) or raising the gas pressure, there is a problem in that a so-called gas rupture failure occurs in which the gas is ejected from the weak skin layer portion formed in the molten synthetic resin.

When the gas rupture failure occurs, uneven parts due to an unintended through hole of gas rupture and the entrainment of the ruptured gas are formed on the design surface, resulting in poor exterior. Furthermore, since the gas pressure in the hollow portion decreases, the pressing force of the molten synthetic resin to the inner surface of the mold cavity due to the gas pressure decreases, transferability of the mold cavity inner surface shape to the skin layer, that is, exterior characteristics of the product of the hollow molded product decrease. For that reason, in the hollow molding method described in Patent Literature 3, it is difficult to set a high hollow ratio of the hollow portion to the product volume. Further, since the molten synthetic resin filled by the short shot previously fills the interior of the mold cavity with an increase in amount of gas ejection (pouring) to be continuously ejected (poured) to the interior thereof, the resin flow of the molten synthetic resin including the gas depends on the resin flow in the mold cavity. For that reason, the resin flow is disturbed in the complex product shape, the reinforcing rib structure of the back surface, the displacement portion of the thickness of the product or the like, and the gas rupture failure is likely to occur. In order to prevent such a gas rupture failure, there are problems such as constraints that form relatively simple shape of the product or shorten the resin flow length between the gate portion in which the molten synthetic resin is filled into the mold cavity and the injection cylinder. Furthermore, because there is a need for a mechanism that moves nozzles for ejecting the gas into the molten synthetic resin in the mold cavity forward and backward in the mold, there are problems in that the control of the nozzle associated with the mold construction and the gas injection becomes complicated, in the form of Patent Literature 3 in which a plurality of nozzles are provided to sequentially eject the gas from the plurality of nozzles in accordance with the inflow state of the molten synthetic resin, or sequentially moves the nozzles backward in accordance with the cooling solidification state of the molten synthetic resin.

Further, the high hollow injection molding method described in Patent Literature 4 is also similar to the hollow injection-molding method described in Patent Literature 3 in that the resin flow of the molten resin including the gas is dependent on the resin flow in the mold cavity due to the expansion of the volume of the mold cavity. For that reason, the resin flow is disrupted in the complex product shape, the reinforcing rib structure of the back surface, the displacement portion of the thickness of the product or the like, the gas rupture failure is likely to occur, and the problem concerning the gas rupture failure is not solved sufficiently.

In contrast, according to the injection molding method according to the sixth embodiment, in the injection filling step, by reducing the volume of the mold cavity than the product volume so that the injection filling rate is substantially 100%, the interior of the reduced mold cavity is filled by the foamable molten resin of the state of not being foamed, and the mold clamping force is applied substantially uniformly to the foamable molten resin in the mold cavity. Thus, the solid skin layer (cooling solidification layer) cooled and solidified by the contact with the inner surface of the mold cavity is formed on substantially the entire surface of the foamable molten resin, thereby suppressing the outflow of the pressurized gas poured into the foamable molten resin later to the outside of the skin layer, a so-called gas rupture failure. Furthermore, high transferability of the inner surface of the mold cavity to the skin layer is secured, and by the mold clamping force substantially uniformly applied to substantially the entire surface of the foamable molten resin containing the foaming agent, the exposure of the foam cell to the skin layer at the time of the formation of the skin layer of the foam cell is suppressed. For this reason, as in the injection molding method of the Patent Literatures 3 and 4, by the pressurized gas to be poured later, the exterior characteristics of the product are improved for the hollow molded product molded by the general hollow injection molding method in which the inner surface shape of the mold cavity is transferred to the skin layer (cooling solidification layer) formed on the molten resin surface only by the resin flow pressure applied unevenly by the free flow of the molten resin freely flowing in the mold cavity after the injection.

Further, unlike the injection molding method of Patent Literatures 3 and 4, in the hollow portion forming step of the injection molding method according to the sixth embodiment, the volume of the mold cavity $9a$ is already substantially the same as the product volume. For this reason, in injection molding method according to the sixth embodiment, there is no volume change of the mold cavity $9a$, and for a case where there is a volume change of the mold cavity $9a$ as in the general high hollow injection molding method, there is provided an effect of reliably lowering the pouring resistance of the pressurized gas prior to the forming step of the hollow portion to reduce the disturbance of the resin flow occurring in the complex product shape, the reinforcing rib structure of the back surface, and the displacement portion of the thickness of the product or the like, which can contribute to reduction of the pouring resistance of the pressurized gas, and can improve the effect of suppressing the gas rupture failure of the pressurized gas.

Furthermore, in the injection molding method according to the sixth embodiment, the pouring place of the pressurized gas is not the molten resin as in the injection molding method of Patent Literatures 3 and 4 but is the foaming layer $9f$ that has the lower concentration and strength with respect to the molten resin and is made of the foam cell. For this reason, as illustrated in FIG. 9B, when the pressurized gas $10b''$ is poured into the foaming layer $9f$ of the foam molded product $9''$ through the skin layer $9e$, the pressurized gas $10b''$ compresses and pours the foaming gas into the foam cell by the gas pressure and the gas flow thereof, and forms a hollow portion, while sequentially destroying the foam cell from the site where the strength and the concentration of the foaming layer $9f$ is weak. Even in the state, the gas rupture failure of the pressurized gas $10b$ is suppressed by the solid skin layer $9e$ formed on substantially the entire surface of the foam molded product $9''$ in the injection filling step. In this way, in the injection molding method according to the sixth embodiment, since the pressurized gas is poured only to the foaming layer $9f$, there are an priority flow effect capable of suppressing the gas rupture failure and specifying the hollow portion forming part due to the pouring of the pressurized gas, and a hollow ratio control effect of the hollow portion to the product volume in which the concentration decrease of the foaming layer $9f$ is substantially the same as the hollow portion (volume) formed by the pouring of the pressurized gas. For that reason, it is possible to perform the hollow ratio control of the hollow portion to the product volume by the expansion ratio control for controlling the foam cell concentration of the foaming layer in the slight mold opening control, and as long as the volume of the mold cavity $9a$ is expanded by a movable core or the like in the mold to form the foaming layer only in a part desired to form the hollow portion, it is possible to perform the selective flow that forms the hollow portion in any part by the priority flow effect. In this way, according to the injection molding method according to the sixth embodiment, in the hollow portion forming step, the pressurized gas is poured into the foaming layer $9f$ including the foam cell having the weaker strength and concentration than the molten resin to form the hollow portion. Therefore, even in the complex product shape, the reinforcing rib structure of the back surface, the displacement portion of the thickness of the product or the like, the flow of pressurized gas is hard to be disturbed by the foaming layer $9f$ formed on the site, and it is possible to set a high hollow ratio of the hollow portion to the product volume, while more reliably suppressing the gas rupture failure.

Here, in the case of using the chemical foaming agent, although the foaming gas pressures in the foam cell within the formed foaming layer differs depending on the type of chemical foaming agent and the molding conditions, generally, the foaming gas pressure is 0.3 to 0.5 MPa (resin temperature 200° C.). In the hollow portion forming step, by increasing the pressurized gas pressure than the foaming gas pressure, by the pressure difference between the pressure of the foaming gas in the foam cell and the pressure of the pressurized gas, when the pressurized gas is poured into the foaming layer, the foaming gas in the foam cell does not become a factor of increasing the pouring resistance, and the foam cell is destroyed sequentially. Along with this, most foaming gas in the foam cell is compressed, and is mixed with the pressurized gas in the formed hollow portion to enter a pressure equilibrium state. As a result, depending on the combination of resin used, the product shape, and the molding conditions, as illustrated in FIG. 9C, it is possible to substantially completely form the volume of the foaming layer $9f$ (for the case where the foaming layer $9f$ is not a foaming layer but a molten layer, the concentration reduction of the foaming layer $9f$ or the expansion ratio) as a hollow portion. For that reason, by controlling the volume (the concentration reduction or the expansion ratio) of the foaming layer $9f$ and the thickness of the skin layer $9e$, it is possible to control the hollow ratio of the hollow portion to the product volume. As in the injection molding method according to the sixth embodiment, the foaming layer $9f$ may not be substantially completely formed as a hollow portion, but the hollow molded product $11f$ may be a layer mixed with the skin layer $9e$ of the foam molded product $9''$ and a part of the foaming layer $9f$.

Furthermore, according to the injection molding method according to the sixth embodiment, in the hollow portion forming step, as illustrated in FIG. 8D, since the pressurized gas $10b''$ is poured into the foaming layer $9f$ of the foam molded product $9''$ from the pressurized gas flow path $10c'$ which is different from the molten resin flow path $9c'$ of the foamable molten resin $9b''$ through the skin layer (cooling solidification layer) $9e$ of the foam molded product $9''$, there is no need for a special structure such as placing the pressurized gas nozzle in the nozzle center of the injection unit, and the pressurized gas $10b''$ can be poured into the foam molded product $9''$ from any plural sites. Further, since the pressurized gas $10b''$ is allowed to pass through the skin layer (cooling solidification layer) $9e$ of the foam molded product $9''$ by the gas pressure from the opening and closing valve $10d'$ disposed in the connection portion by which the pressurized gas flow path $10c'$ is connected to the mold cavity $9a$, the fixed mold 2 does not require a special opening and closing valve or the like for pouring the pressurized gas $10b''$ into the foam molded product $9''$.

Seventh Embodiment

Figure 10A:
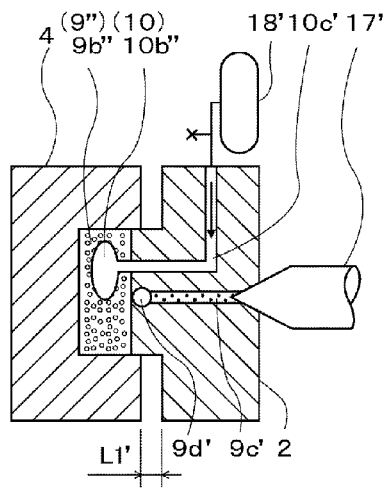
FIG. 10A is a schematic cross-sectional view illustrating a second injection filling step (hollow portion forming step) of an injection molding method according to a seventh embodiment of the invention.
Figure 10B:
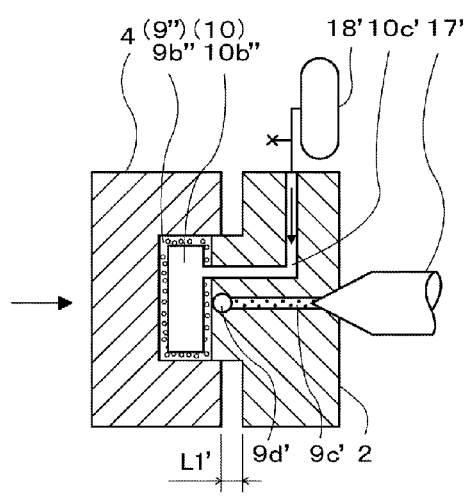
FIG. 10B is a schematic cross-sectional view illustrating a state in which the second injection filling step (hollow portion forming step) of the injection molding method according to the seventh embodiment is completed.
Figure 10C:
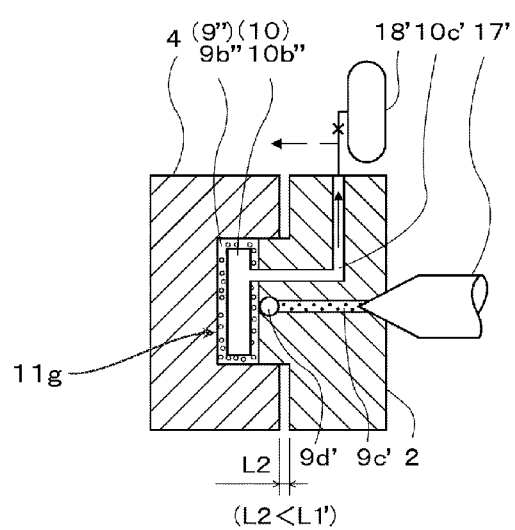
FIG. 10C is a schematic cross-sectional view illustrating a mold cavity reduction step of the injection molding method according to the seventh embodiment.

Next, an injection molding method according to a seventh embodiment of the invention will be described with reference to FIGS. 10A to 10C. FIGS. 10A to 10C are schematic cross-sectional views of a mold illustrating steps of the injection molding method according to the seventh embodiment different from the injection molding method according to the sixth embodiment described above.

The injection molding method according to the seventh embodiment is different from the injection molding method according to the sixth embodiment in that the mold cavity expansion step is a step of expanding the mold cavity 9a so that the volume of the mold cavity 9a becomes greater than the volume of the product, and the method includes a mold cavity reduction step of reducing the volume of the mold cavity 9a to the volume of the product after the completion of the mold cavity expansion step, and after the start of the hollow portion forming step (that is, during the hollow portion forming step or after the completion of the hollow portion forming step). The molding steps other than this step are basically the same as the injection molding method according to the sixth embodiment, and it is possible to use basically the same injection molding machine and mold as those described in the sixth embodiment. Therefore, a description will be given only of differences from the injection molding method according to the sixth embodiment.

FIG. 10A illustrates a hollow portion forming step of opening the opening and closing valve 10d' of the pressurized gas flow path 10c' to pour the pressurized gas 10b" into the foaming layer 9f of the foam molded product 9" from the pressurized gas unit 18'. In the injection molding method according to the seventh embodiment, the mold cavity expansion step is a step of opening the movable mold 4 in the direction away from the fixed mold 2 by the small quantity of mold opening L1' greater than the small quantity of mold opening L1 by a mold opening and closing mechanism (not illustrated), thereby making the volume of the mold cavity 9a greater than the volume of the product.

In the state illustrated in FIG. 10A, the foaming layer 9f of the foam molded product 9" is a foaming layer formed of the foam cell with the weak strength and concentration. Further, in the foaming layer 9f of the molten resin 9b, most foaming cells are destroyed and the hollow portion is formed, but the foaming layer 9f (not illustrated) formed in the thinned portion such as a reinforcing rib of the product is not yet in the state of being formed as a hollow portion. Moreover, as illustrated in FIG. 10B, from the state illustrated in FIG. 10A, the pouring of the pressurized gas 10b" into the foaming layer 9f of the foam molded product 9" is completed, and the hollow molded product 11g formed with the desired hollow portion is formed in the mold cavity 9a.

Moreover, after the completion of the mold cavity expansion step illustrated in FIG. 10A, from the state in the middle of the hollow portion forming step or the state immediately after the hollow portion forming step illustrated in FIG. 10B is completed, as illustrated in FIG. 10C, the movable mold 4 is clamped to the fixed mold 2 side by the mold opening and closing mechanism (not illustrated) until the small quantity of mold opening L1' is altered to L2, thereby reducing the volume of the mold cavity 9a (mold cavity reduction step). The volume of the mold cavity 9a of the clamped state until the small quantity of mold opening L1' is altered to L2 is substantially the same as the product volume. Due to the mold cavity reduction step, since the pressurized gas 10b" poured by a lot of specified amount (volume) is boosted within the hollow portion, the boosted pressurized gas 10b" continues to form the hollow portion while being further sequentially destroyed, from the site with the weak strength and concentration of the foam cell still remaining in the foam layer 9f. Moreover, the pressurized gas 10b" is also poured into the foam cell portion of the foaming layer 9f formed in the thinned portion such as a reinforcing rib of the product, and the hollow portion is formed.

It is preferred that the discharge of the pressurized gas in the hollow portion of the hollow molded product 11g be performed after the start of the mold cavity reduction step (that is, during the mold cavity reduction step or after the completion of the mold cavity reduction step). This is for the purpose of obtaining the same effects as the injection compression molding method and the injection press molding method of suppressing the deformation of the molded product at the time of the cooling solidification, and improving the pressure-increasing effect of the pressurized gas pressure in the hollow portion due to the mold cavity reduction step. The same is also true for a case where the gas counter pressure method is adopted in the injection molding method according to the seventh embodiment.

Moreover, after the cooling solidification of the hollow molded product 11g molded in the mold cavity 9a is completed from the state illustrated in FIG. 10C, as in the injection molding method according to the sixth embodiment, the movable mold 4 is opened from the fixed mold 2 by a mold opening and closing mechanism (not illustrated), the hollow molded product 11g is transported to the outside of the injection molding machine by a product take-out means (not illustrated), and the molding cycle is completed.

According to the injection molding method according to the seventh embodiment, similarly to the injection molding method according to the sixth embodiment, the gas rupture failure of the pressurized gas 10b" is suppressed by the solid skin layer 9e formed on substantially the entire surface of the foamable molten resin 9b" in the injection filling step. Further, as a result, it is possible to set a high hollow ratio of the hollow portion to the product volume.

Further, in the injection molding method according to the seventh embodiment, since the mold cavity expansion step is a step that expands the volume of the mold cavity by a specified quantity greater than the product volume, for the case of expanding the volume of the mold cavity to the product volume as in the injection molding method according to the sixth embodiment, the reduction effect of the pouring resistance of the pressurized gas in the hollow portion forming step is further increased, thereby improving the pouring characteristics of the pressurized gas, and it is possible to physically increase the pouring amount (volume) of the pressurized gas 10b" capable of being poured. Further, depending on the conditions, the thickness of the skin layer formed in a portion having the product thickness of 1 mm is generally 0.4 to 0.5 mm at one side, and in this state, it is very difficult to pour the pressurized gas into the molten resin to form the hollow portion. However, as long as the portion having the product thickness of 1 mm is temporarily expanded to 1.5 to 2 mm by the expansion of the mold cavity volume, it is possible to perform pouring of the pressurized gas to this portion and the formation of the hollow portion. The quantity of expansion of the mold cavity volume expanded temporarily may be suitably selected by the mold construction, the product shape, the hollow ratio of the hollow portion to the product volume or the like.

Furthermore, according to the injection molding method according to the seventh embodiment, it is possible to mold the hollow molded product which has the excellent product exterior characteristics and in which the hollow portion is formed substantially uniformly on substantially the entire surface including the thinned portion such as a reinforcing rib of the product, by the mold cavity reduction step of reducing the volume of the mold cavity to the product volume. Furthermore, since it is possible to apply a substantially uniform clamping force to the hollow molded product 11g by the mold cavity reduction step, it is possible to expect the same effect as the injection compression molding method and the injection press molding method of reducing the residual stress in the hollow molded product 11g to suppress the deformation of the molded product at the time of the cooling solidification. Furthermore, according to the injection molding method according to the seventh embodiment, since the pressurized gas pressure in the hollow portion is boosted by the mold cavity reduction step, it is possible to lower the pressurized gas supply pressure of the pressurized gas unit 18', and thus it is possible to expect an improvement in associated safety of the pressurized gas unit 18', and the reduction of equipment and pressurized gas management costs.

The invention is not limited to the embodiments described above, but can be implemented in various forms. For example, in the injection molding method according to the first to seventh embodiments, in order to simplify the description and drawings, it has been assumed that the mold cavity expansion step, the mold cavity re-expansion step, and the mold cavity reduction step vary the volume of the mold cavity in the mold opening and closing operation due to the mold opening and closing mechanism of the injection molding machine, based on the mold of the share edge structure. However, the means for varying the volume of the mold cavity is not limited to the mold opening and closing operation due to the mold opening and closing mechanism of the injection molding machine, but may be a means such as the movement operation or the like of the mold movable portion that is capable of optionally controlling the volume of the mold cavity, the variable speed, the variable volume holding force (mold position holding force) or the like against the gas pressure in the mold cavity or the resin pressure in the mold cavity.

For example, as in the injection molding method according to the first to seventh embodiments, as long as the volume of the mold cavity is varied in the mold opening and closing operation due to the mold opening and closing mechanism of the injection molding machine based on the mold of the share edge structure, it is possible to mold the sandwich molded product or the hollow molded product in which the inner layer molten resin or the hollow portion is formed substantially uniformly on substantially the entire surface of the mold projection surface of the product. In this case, as long as the mold opening and closing mechanism is a toggle-type mold clamping mechanism suitable for precision mold opening and closing control, preferably, an electric toggle-type mold clamping mechanism, the filling ratio of the inner layer molten resin to the product volume or the hollow ratio of the hollow portion, and the product thickness and the hollow portion thickness can be controlled with a high degree of accuracy in connection with other molding conditions.

Furthermore, when there is a thick portion or the like desired to partially increase the filling ratio of the inner layer molten resin to the product volume or the hollow ratio of the hollow portion, the injection molding method according to the first to seventh embodiments may be carried out, by providing the site with the mold movable portion such as the mold cavity to partially vary the volume of the mold cavity.

Furthermore, even in the mold of the general structure having a mold division surface including only a plane perpendicular to the mold opening and closing direction (also referred to as PL surface) but not a share edge structure, although there are certain constraints, it is possible to perform the injection molding method according to the first to seventh embodiments. Specifically, based on the constrains that a thick skin layer of the molten resin in the vicinity of the mold division surface is formed by the temperature control of the mold for reducing the small quantity of mold opening in the mold cavity expansion step, or the molten resin in the vicinity of the mold division surface is formed only by the skin layer molten resin, for a case where the mold of the share edge structure or the like is used, there is no choice but to lower the filling ratio of the inner layer of the molten resin to the product volume or the hollow ratio of the hollow portion. However, it is possible to prevent the molten resin injected and filled into the mold cavity from leaking from the mold division surface of the mold that is slightly opened.

Furthermore, in the case of the mold having the common structure, as in the injection molding method according to the first to third embodiments, as long as the foamable molten resin containing the foaming agent is adopted as the surface layer molten resin, since the strength of the skin layer of the foam molded layer formed as the surface layer is reliably higher than the strength of the foaming layer including the foam cell, the inner layer molten resin flows only in the foaming layer. Accordingly, for a case where the surface layer molten resin is a non-foamable surface layer molten resin containing no foaming agent, the surface layer molten resin and the inner layer molten resin injected and filled into the mold cavity is more reliably prevented from leaking from the mold division surface of the mold that is slightly opened. Furthermore, in the injection molding method according to the sixth and seventh embodiments, since the strength of the skin layer formed on substantially the entire surface of the molten resin is reliably higher than the strength of the foaming layer including the foam cell, the pressurized gas flows only in the foaming layer. Accordingly, for the case of a non-foamable molten resin containing no foaming agent, there is high leakage prevention of the molten resin injected and filled into the mold cavity, from the mold division surface of the mold that is opened slightly.

It is possible to suitably select an optimal form including the structure of the mold to be used whether the mold cavity expansion step, the mold cavity re-expansion step, and the mold cavity reduction step of the injection molding method according to the first to seventh embodiments is performed by one of the forms of the mold opening and closing operation due to the mold opening and closing mechanism of the injection molding machine, and the movement operation of the movable part in the mold or is formed by the combination thereof, in view of the shape of the sandwich molded product and the sandwich structure part, the resin material of the surface layer and the inner layer concerning the specifications of the sandwich molded product, the filling ratio of the inner layer molten resin to the product volume or the like, or the shape of hollow molded product and the hollow portion, the resin material concerning the specifications of the hollow molded product, the hollow ratio of the hollow portion to the product volume or the like.

As another form of the injection molding method according to the sixth and seventh embodiments, an insert decorative molding method of integrally molding a sheet-like insert member having decorative characteristics and functional characteristics on the design surface of the resin molded product is also one of the injection molding methods capable of taking advantage of the characteristics of the invention. Specifically, as long as the injection molding method according to the sixth and seventh embodiments is implemented by setting the sheet-like insert member having decorative characteristics and functional characteristics as the design surface side of the mold, the skin layer is pressed against the inner surface of the mold cavity only by the pressure of the pressurized gas. Accordingly, for the general hollow injection molding method not suitable for the combination with the epidermal decorative molding method, it is possible to secure adhesive characteristics between the insert member and the skin layer surface, and high transferability of the mold cavity inner surface to the insert member integrated with the skin layer surface, and it is possible to mold the insert decorative molded product having the excellent exterior characteristics. Further, in a case where the insert member is a material that easily reduces the decorative characteristics and the design characteristics by heat and pressure, such as a material with print pattern, a material with soft feeling or a raising material having decorative characteristics and design characteristics, after securing the adhesive characteristics to the insert member and the skin surface layer and high transferability of the mold cavity inner surface to the insert member, by combining the pressure control of the pressurized gas pressure or the like in the hollow portion forming step of forming the hollow portion, in addition to the mold opening and closing mechanism control or the movement operation control of the mold movable portion, the suitable decompression control of the pressure applied to the insert member is performed, and it is possible to more effectively suppress the decrease in decorative characteristics and design characteristics.

INDUSTRIAL APPLICABILITY

According to the injection molding method of the sandwich molded product according to the first to fifth embodiments, in order to prevent the resin reversal failure, the mold does not require a mixing nozzle required for the injection unit, a complex hot runner arrangement such as the coaxial arrangement of the hot runner for forming the laminar flow, a special gate structure or a special gate valve reliably capable of injecting and filling the inner layer molten resin into the surface layer molten resin even in short shot or the like, and it is possible to mold a sandwich molded product having the excellent product exterior characteristics in which the resin reversal failure is suppressed even when a high filling ratio of the inner layer molten resin to the product volume is set. For that reason, the invention can be implemented not only in the dedicated injection molding machine for sandwich molding, but in a general-purpose injection molding machine added with a commercially available retrofit injection unit. That is, it is not necessary to introduce an expensive dedicated injection molding machine for sandwich molding, it is possible to properly use the general-purpose injection molding machine for common molding purpose and for sandwich molding purpose at low cost according to demand, and the industrial utility value is extremely high for the manufacturer of the resin molded product.

Furthermore, in recent years, in response to the environmental issues or the like, the resin molded product to be adopted in home appliances, OA equipment, automotive parts and the like has required the weight reduction, an increase usage of recycled resin or the like. In the injection molding method of the sandwich molded product according to the first to fifth embodiments, the foamable molten resin containing the foaming agent rarely used for the surface layer molten resin due to the problems such as an exposure of the foam cell to the skin layer in the common sandwich injection molding method can be used as the surface layer molten resin, by substantially uniformly applying the mold clamping force to substantially the entire surface of foamable molten resin containing the foaming agent by the injection filling step performed by reducing the volume of the mold cavity than the product volume so that the injection filling rate is about 100%, thereby suppressing the exposure of the foam cell to the skin layer at the time of the skin layer formation. For that reason, compared to the common sandwich molded product that uses the non-foamable molten resin containing no foaming agent as the surface layer molten resin, it is possible to mold a sandwich molded product in which the filling ratio of the inner layer molten resin to the product volume is greatly improved. Furthermore, even when a high filling ratio of the inner layer molten resin to the product volume is set, since the resin reversal failure can be suppressed, it is possible to more use the recycled resin as the inner layer molten resin. Furthermore, since the injection molding method of the sandwich molded product according to the first to fifth embodiments does not require a special structure in the injection unit and the mold, the method is easily performed in combination with the well-known injection molding method such as an epidermal decorative molding method of setting the sheet-like epidermal material having decorative characteristics and functional characteristics on the design surface side of the mold and to mold epidermal material integrally with the resin molded product in the mold. For that reason, it is possible to combine the injection molding method of the sandwich molded product according to the first to fifth embodiments with the well-known injection molding method to cope with the demand for various resin molded products, and the industrial utility value is extremely high.

According to the injection molding method of the hollow molded product according to the sixth and seventh embodiments, there is no need for a structure that arranges the pressurized gas nozzle in the center of the nozzle of the injection unit, a special opening and closing valve for pouring the pressurized gas into the foam molded product or the like, as in the common hollow injection molding method, it is possible to mold the hollow molded product having the excellent product exterior characteristics in which the gas rupture failure is suppressed even when a high hollow ratio of the hollow portion to the product volume is set. For that reason, the injection molding method according to the sixth and seventh embodiments can be implemented not only in the dedicated injection molding machine for hollow molding but in a general-purpose injection molding machine with a retrofitted pressurized gas unit. That is, it is not necessary to introduce a dedicated injection molding machine for hollow injection, it is possible to properly use the general-purpose injection molding machine for a common molding purpose and for a hollow injection molding purpose according to demand at a low cost, and the industrial utility value is extremely high for the manufacturer of the resin molded product.

Further, the insert decorative molded product molded by the insert decorative molding method described above is a product in which the decorative characteristics and the functional characteristics hard to be obtained in the resin material is applied to the resin molded product, and has been often adopted in home appliances, OA equipment, automotive parts and the like in recent years. Furthermore, in recent years, in the resin molded product, further weight reduction has been required due to the response to the environmental issues or the like. In view of the balance between the application of decorative characteristics and functional characteristics to the resin molded product and the weight reduction, the insert decorative hollow molded product capable of being molded by the combination of the injection molding method of the hollow molded product according to the sixth and seventh embodiments capable of expecting the further weight reduction of the hollow molded product suitable for the weight reduction of the resin molded product and the epidermal decorative molding method is one of the best solutions, and the industrial utility value is extremely high even in that respect.

REFERENCE SIGNS LIST 2 fixed mold (first mold), 4 movable mold (second mold), 9a mold cavity, 9b surface layer molten resin, 9b' surface layer foamable molten resin, 9b" foamable molten resin, 10b inner layer molten resin, 10b' inner layer foamable molten resin, 10b" pressurized gas, 11a to 11e sandwich molded product, 11f, 11g hollow molded product.

The invention claimed is:

1. An injection molding method for molding a sandwich molded product including a surface layer and an inner layer using a first mold and a second mold which are capable of forming a mold cavity, the method comprising:
   a mold clamping step of clamping the first mold and the second mold to form the mold cavity;
   a first injection filling step of injecting a non-foamable molten resin to the mold cavity to fill an interior of the mold cavity with the non-foamable molten resin, after completion of the mold clamping step;
   a mold cavity expansion step of slightly opening at least one of the first mold and the second mold with respect to the other thereof by a specified quantity to expand the mold cavity, after the completion of the first injection filling step; and
   a second injection filling step of injecting and filling a molten resin into the non-foamable molten resin within the mold cavity, after the start of the mold cavity expansion step.

2. The injection molding method according to claim 1, wherein the mold cavity expansion step is a step of expanding the mold cavity so that a volume of the mold cavity becomes a volume greater than a volume of the molded product, and
   the injection molding method further includes a mold cavity reduction step of reducing the mold cavity by a specified quantity so that the volume of the mold cavity becomes the volume of the molded product, after the completion of the mold cavity expansion step, and after the start of the second injection filling step.

3. The injection molding method according to claim 1 or 2,
   wherein at least one of expansion and reduction of the mold cavity is performed by at least one of a mold opening and closing operation of a mold opening and closing mechanism of an injection molding apparatus, and a movement operation of a movable part in the mold.

* * * * *